United States Patent
Duquesne et al.

(10) Patent No.: US 12,217,342 B1
(45) Date of Patent: Feb. 4, 2025

(54) DEVICES, METHODS AND GRAPHICAL USER INTERFACES FOR GOAL-BASED ANIMATION

(71) Applicant: Apple Inc., Cupertino, CA (US)

(72) Inventors: Gregory Duquesne, San Carlos, CA (US); Arnold H. Cachelin, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 297 days.

(21) Appl. No.: 17/659,792

(22) Filed: Apr. 19, 2022

Related U.S. Application Data

(60) Provisional application No. 63/209,356, filed on Jun. 10, 2021.

(51) Int. Cl.
*G06T 13/00* (2011.01)
*G06T 11/00* (2006.01)

(52) U.S. Cl.
CPC .............. *G06T 13/00* (2013.01); *G06T 11/00* (2013.01); *G06T 2200/24* (2013.01)

(58) Field of Classification Search
None
See application file for complete search history.

(56) References Cited

U.S. PATENT DOCUMENTS

| | | | |
|---|---|---|---|
| 6,057,859 A | 5/2000 | Handelman et al. | |
| 10,792,568 B1* | 10/2020 | Merrill | A63F 13/56 |
| 2010/0202257 A1* | 8/2010 | Abe | G11B 20/10 |
| 2022/0197373 A1* | 6/2022 | Guerra Filho | G06N 3/044 |
| 2022/0355188 A1* | 11/2022 | Tsuchiya | A63F 13/213 |

OTHER PUBLICATIONS

Vitzthum et al., "Action Description for Animation of Virtual Characters", Virtual Reality and Multimedia Group Institute for Informatics, 2009, 12 pages.

* cited by examiner

Primary Examiner — Tapas Mazumder
(74) Attorney, Agent, or Firm — Kubota & Basol LLP

(57) ABSTRACT

A computer-generated environment may include a virtual agent and a plurality of targets. Movements of the virtual agent to the plurality of targets can be defined and the movements of the virtual agent to the plurality of targets may be interpolated, such that to generate an interpolated animation path of movement of the virtual agent to the first target and to the second target.

20 Claims, 12 Drawing Sheets

700 →

GO-TO MOVEMENT PARAMETERS
- ☑ INERTIA ▼ ~701    `0,1`
- ☑ ACTION DURATION ▼ ~702    `1`
  - ☐ START TIME ☐▼ ~702A
- ☑ INITIAL POSITION ▼ ~703    `0,0`
- ☑ TARGET ▼ ~704
  - ☐ POSITION ▼ ~705    `-2,-4`
  - ☑ OBJECT ▽
    - 706 → -OBJECT 1
    - -OBJECT 2 ~707
    - ⋮
    - -OBJECT N
- ☑ MOVEMENT FUNCTION ▽ ▼ ~708
  - 709 → -LINEAR
  - -QUADRATIC
  - ⋮

TARGET PARAMETERS
- ☑ STATIC ~711
  - - POSITION ▼ ~712    `-2,-4`
- ☐ DYNAMIC ▼ ~713
  - ☐ INITIAL POSITION ▼ ~714
  - ☐ ACTION DURATION ▼ ~715
  - ☐ MOTION CHARACTERISTICS ▽
    - 716 → -CHARACTERISTIC 1
    - 717 → -CHARACTERISTIC 2
    - ⋮

902 — While presenting the computer-generated environment including a first virtual agent and a plurality of targets, the plurality of targets including a first target and a second target, define a plurality of movements of the first virtual agent including a first movement of the first virtual agent to the first target and a second movement of the first virtual agent to the second target 904 — Interpolate the first movement and the second movement to generate an interpolated animation path of movement of the first virtual agent to the first target and to the second target, wherein the animation path is different from a first animation path for animating the first movement and a second animation path for animating the second movement 906 — The first virtual agent moves along the interpolated path to the first target and to the second target, such that the animation of the movement is displayed 908 — The defining the plurality of movements of the first virtual agent includes a pause between the first movement and the second movement, and wherein the interpolated animation path reduces or eliminates a pause between an end of the first movement and a start of the second movement 910 — The interpolation of the first movement and the second movement comprises generating the first animation path and the second animation path, and generating the interpolated animation path as an animation of the first virtual agent moving with an inertial delay to follow a position along the first animation path and the second animation path 912 — The inertial delay defines a spring relationship between the first virtual agent and the position along the first animation path and the second animation path 914 — Defining the plurality of movements comprises defining a first inertia parameter for the first movement and a second inertia parameter, different than the first inertia parameter, for the second movement, wherein the interpolation of the first movement and the second movement is based on the first inertia parameter and the second inertia parameter

DEVICES, METHODS AND GRAPHICAL USER INTERFACES FOR GOAL-BASED ANIMATION

CROSS-REFERENCE TO RELATED APPLICATIONS

This application claims the benefit of U.S. Provisional Application No. 63/209,356, filed Jun. 10, 2021, the contents of which are incorporated herein by reference in its entirety for all purposes.

FIELD OF THE DISCLOSURE

This relates generally to devices, methods, and graphical user interfaces for a virtual agent, and more specifically to goal-based animation of virtual agent.

BACKGROUND OF THE DISCLOSURE

Computer-generated environments are environments where at least some objects displayed for a user's viewing are generated using a computer. A virtual agent displayed in the computer-generated environment may perform various actions, including an animated motion toward a specified target.

SUMMARY OF THE DISCLOSURE

Some embodiments described in this disclosure are directed to devices, methods, and graphical user interfaces for a virtual agent in a computer-generated environment. Some embodiments described in this disclosure are directed to animations of a virtual agent moving to one or more targets within the computer-generated environment. Some embodiments described in this disclosure are directed to defining a plurality of movements of the virtual agent, including a first movement of the virtual agent to a first target of the plurality of targets and a second movement of the virtual agent to a second target of the plurality of targets. Some embodiments described in this disclosure are directed to an interpolation of the first movement and the second movement to generate an interpolated animation path of movement, where the interpolated animation path is different from a first animation path for animating the first movement and a second animation path for animating the second movement. Some embodiments described in this disclosure are directed to defining a plurality of movements of the virtual agent and of one or more of the plurality of targets, where an interpolation of a respective movement of the plurality of movements generates a respective second-order animation path of movement, the animation path being different from a first-order animation path for animating the respective movement. The devices, methods, and graphical user interfaces for a virtual agent provide an improved and simplified user experience for animating virtual agents in computer-generated environments. For example, the animation of the movement of the virtual agent along the interpolated animation path may be smoothed, allowing for a more continuous and natural animation of movement between the plurality of targets, and reducing the complexity and time consumption associated with achieving the same animations without interpolation. It is understood that this Summary does not limit the scope of the disclosure in any way. Additional descriptions of the embodiments of this disclosure are provided in the Drawings and the Detailed Description that follow.

BRIEF DESCRIPTION OF THE DRAWINGS

FIGS. 7A-7B illustrate example representations of user interfaces for defining parameters of a movement of a virtual agent, and optionally of a target, according to some embodiments of the disclosure.

FIG. 9 illustrates an example process for goal-based animation of a virtual agent in a computer-generated environment in accordance with some embodiments of the disclosure.

DETAILED DESCRIPTION

Figure 1:
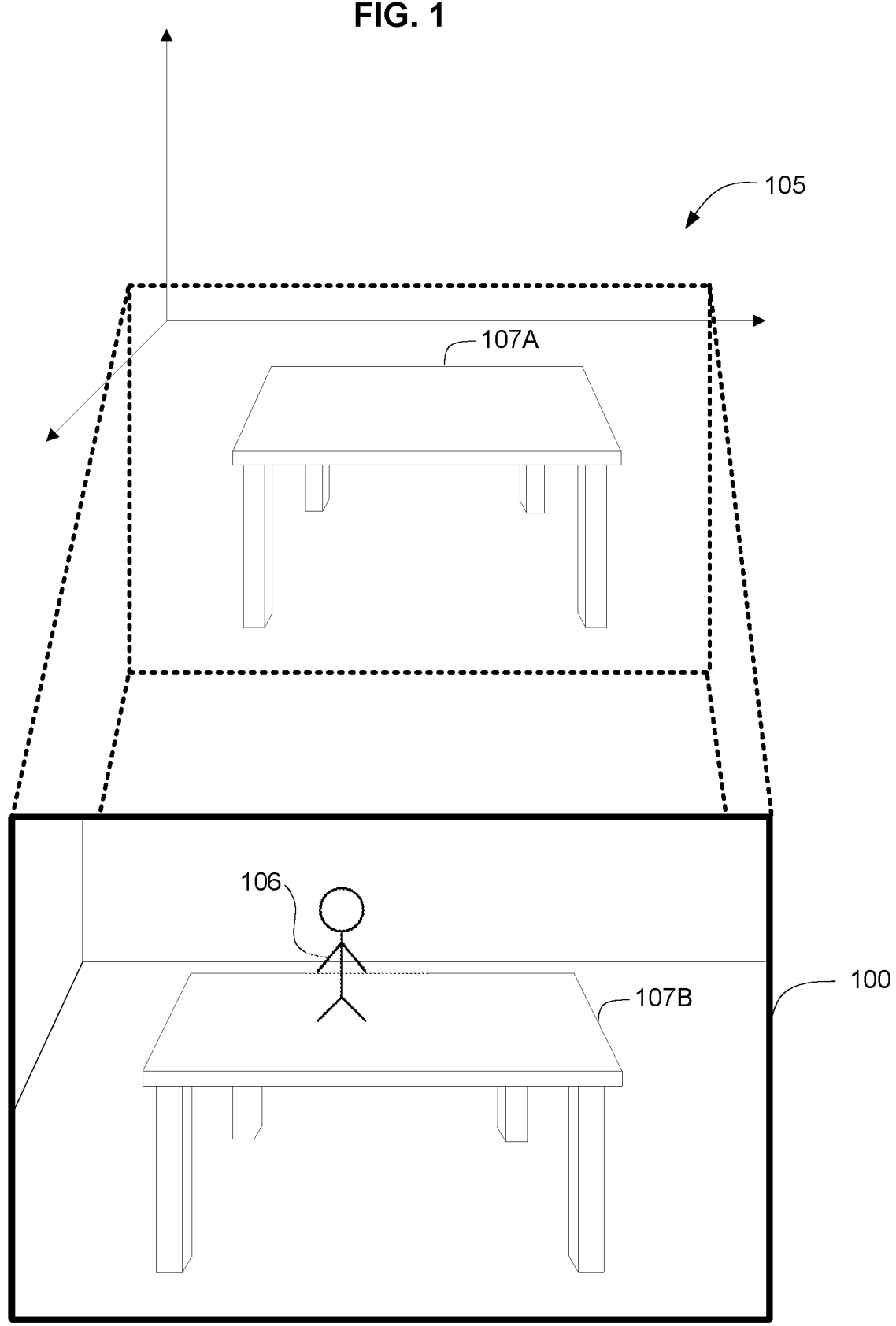
FIG. 1 illustrates an electronic device displaying a computer-generated environment according to some embodiments of the disclosure.

Reference is made, in the following description, to the accompanying, and in which it is shown by way of illustration specific embodiments that are optionally practiced. It is to be understood that other embodiments are optionally used and structural changes are optionally made without departing from the scope of the disclosed embodiments.

A physical environment refers to a physical world that people can sense and/or interact with without aid of electronic devices. The physical environment may include physical features such as a physical surface or a physical object. For example, the physical environment corresponds to a physical park that includes physical trees, physical buildings, and physical people. People can directly sense and/or interact with the physical environment such as through sight, touch, hearing, taste, and smell. In contrast, an extended reality (XR) environment refers to a wholly or partially simulated environment that people sense and/or interact with via an electronic device. For example, the XR environment may include augmented reality (AR) content, mixed reality (MR) content, virtual reality (VR) content, and/or the like. With an XR system, a subset of a person's physical motions, or representations thereof, are tracked, and, in response, one or more characteristics of one or more virtual objects simulated in the XR environment are adjusted in a manner that comports with at least one law of physics.

As one example, the XR system may detect head movement and, in response, adjust graphical content and an acoustic field presented to the person in a manner similar to how such views and sounds would change in a physical environment. As another example, the XR system may detect movement of the electronic device presenting the XR environment (e.g., a mobile phone, a tablet, a laptop, or the like) and, in response, adjust graphical content and an acoustic field presented to the person in a manner similar to how such views and sounds would change in a physical environment. In some situations (e.g., for accessibility reasons), the XR system may adjust characteristic(s) of graphical content in the XR environment in response to representations of physical motions (e.g., vocal commands).

There are many different types of electronic systems that enable a person to sense and/or interact with various XR environments. Examples include head mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers, with or without haptic feedback), smartphones, tablets, and desktop/laptop computers. A head mountable system may have one or more speaker(s) and an integrated opaque display. Alternatively, a head mountable system may be configured to accept an external opaque display (e.g., a smartphone). The head mountable system may incorporate one or more imaging sensors to capture images or video of the physical environment, and/or one or more microphones to capture audio of the physical environment. Rather than an opaque display, a head mountable system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In some implementations, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

FIG. 1 illustrates an electronic device 100 according to some embodiments of the disclosure. In some embodiments, electronic device 100 is a portable electronic device, such as a tablet computer, laptop computer or a smartphone (or another device including a display/display generation component). Example architectures of electronic device 100 are described below with reference to the block diagrams of FIGS. 2A-2B. FIG. 1 illustrates electronic device 100 and table 107A located in the physical environment 105. In some embodiments, electronic device 100 is configured to capture and/or display areas of physical environment 105 (also referred to herein as a real-world environment) including table 107A (illustrated in the field of view of electronic device 100). In some embodiments, the electronic device 100 is configured to display one or more virtual objects in the computer-generated environment that are not present in the physical environment 105, but are displayed in the computer-generated environment (e.g., positioned on or otherwise anchored to the top surface of a computer-generated representation 107B of real-world table 107A). In FIG. 1, for example, an object-virtual agent 106—is displayed on the surface of the computer-generated representation 107B of table 107A in the computer-generated environment displayed via device 100, optionally in response to detecting the planar surface of table 107A in the physical environment 105. It should be understood that although virtual agent 106 is represented in FIG. 1 that virtual agent 106 is a representative object and one or more different objects (e.g., of various dimensionality such as two-dimensional or three-dimensional objects) can be included and rendered in a two-dimensional or a three-dimensional computer-generated environment. For example, the virtual objects can include an application or a user interface displayed in the computer-generated environment. Additionally, it should be understood, that the three-dimensional (3D) environment (or 3D object) described herein may be a representation of a 3D environment (or 3D object) displayed in a two dimensional (2D) context (e.g., displayed on a 2D display screen).

Figure 2A:
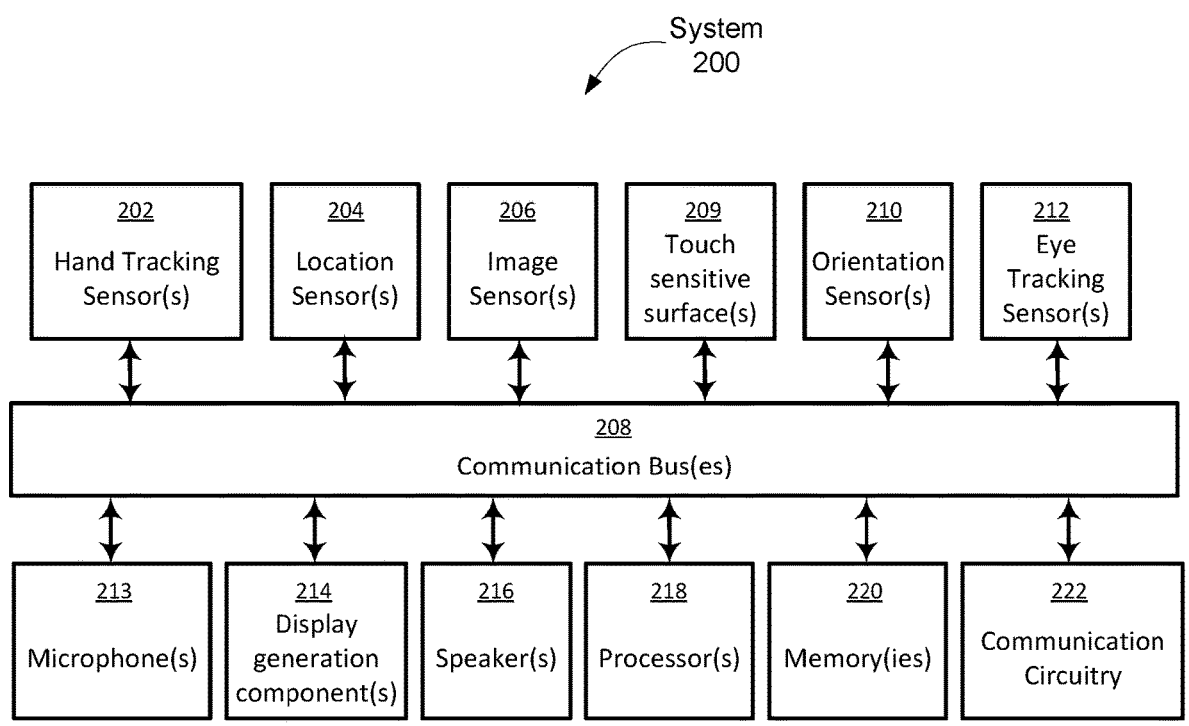
FIGS. 2A-2B illustrate example block diagrams of architectures for a system or device in accordance with some embodiments of the disclosure.
Figure 2B:
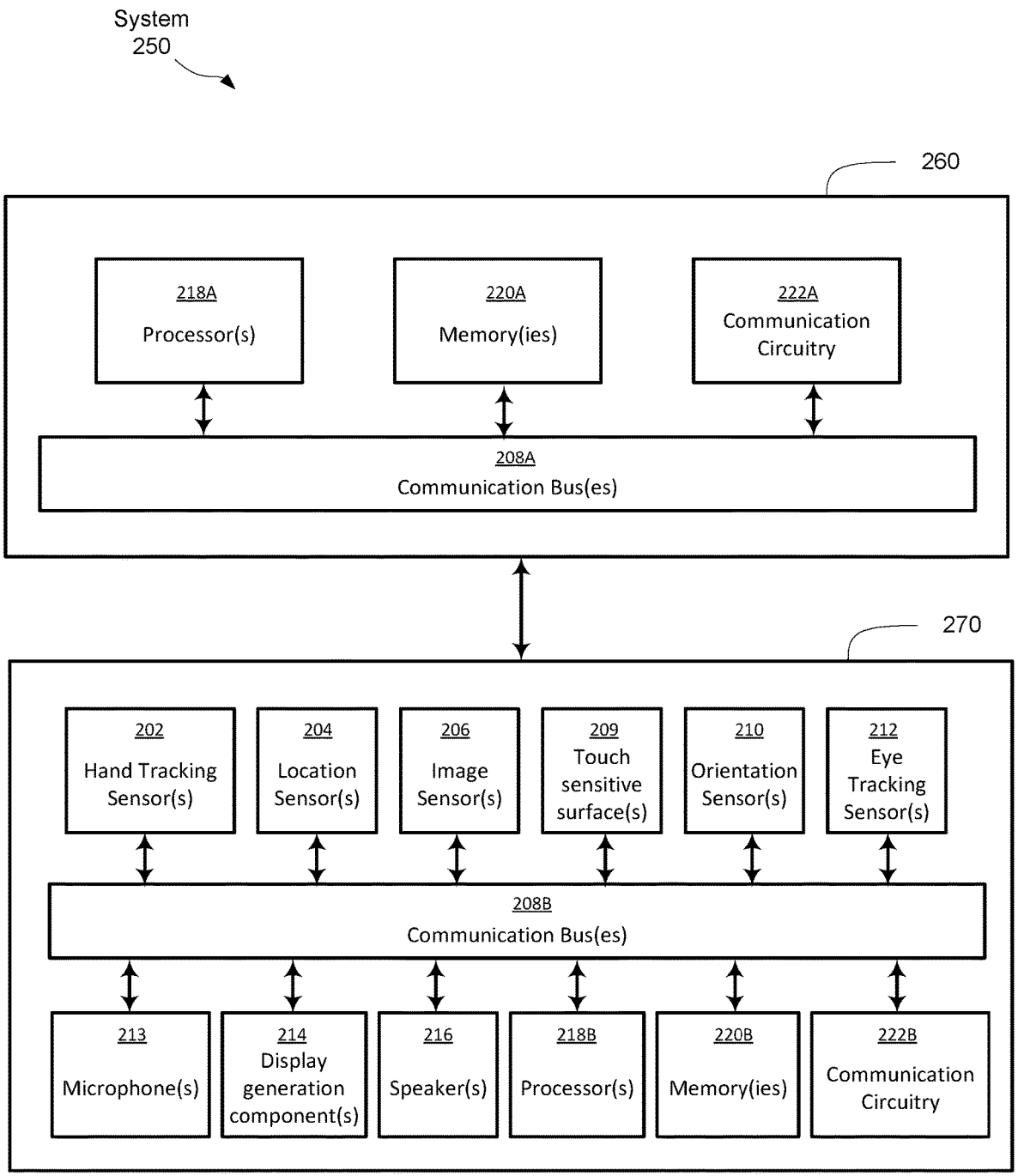

FIGS. 2A-2B illustrate example block diagrams of architectures for a system or device in accordance with some embodiments of the disclosure. In some embodiments, device 200 is a portable device, such as a mobile phone, smart phone, a tablet computer, a laptop computer, an auxiliary device in communication with another device, etc. As illustrated in FIG. 2A, device 200 optionally includes various sensors (e.g., one or more hand tracking sensor(s) 202, one or more location sensor(s) 204, one or more image sensor(s) 206, one or more touch-sensitive surface(s) 209, one or more motion and/or orientation sensor(s) 210, one or more eye tracking sensor(s) 212, one or more microphone(s) 213 or other audio sensors, etc.), one or more display(s) 214, one or more speaker(s) 216, one or more processor(s) 218, one or more memories 220, and/or communication circuitry 222. One or more communication buses 208 are optionally used for communication between the above-mentioned components of device 200.

Communication circuitry 222 optionally includes circuitry for communicating with electronic devices, networks, such as the Internet, intranets, a wired network and/or a wireless network, cellular networks and wireless local area networks (LANs). Communication circuitry 222 optionally includes circuitry for communicating using near-field communication (NFC) and/or short-range communication, such as Bluetooth®.

Processor(s) 218 optionally include one or more general purpose processors, one or more graphics processors, and/or one or more digital signal processors (DSPs). In some embodiments, memory 220 is a non-transitory computer-readable storage medium (e.g., flash memory, random access memory, or other volatile or non-volatile memory or storage) that stores computer-readable instructions configured to be executed by processor(s) 218 to perform the techniques, processes, and/or methods described below. In some embodiments, memories 220 include more than one non-transitory computer-readable storage medium. A non-transitory computer-readable storage medium can be any medium (e.g., excluding a signal) that can tangibly contain or store computer-executable instructions for use by or in connection with the instruction execution system, apparatus, or device. In some embodiments, the storage medium is a transitory computer-readable storage medium. In some embodiments, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like.

Display(s) 214 optionally include a single display (e.g., a liquid-crystal display (LCD), organic light-emitting diode (OLED), or other types of display). In some embodiments, display(s) 214 include multiple displays. In some embodiments, display(s) 214 includes a display with a touch-sensitive surface (e.g., a touch screen), a projector, a holographic projector, a retinal projector, etc. In some embodiments, the display(s) 214 include an at least partially transparent display in which the real-world environment is visible and presented to the user (e.g., an optical pass-through without computer-generation of the real-world environment), and in which virtual content is additionally displayed using the display-generation component. In some embodiments, display(s) 214 display a virtual computer-generated environment with virtual content and/or with representations of the real-world environment (e.g., provided by image sensors and passed through to the display). As used herein, presenting an environment includes presenting a real-world environment (e.g., optical pass-though), presenting a representation of a real-world environment (e.g., displaying image/video-pass though using a display), and/or presenting a virtual environment. Virtual content (e.g., user interfaces, virtual agents, etc.) can also be presented with these environments (e.g., displayed via a display). It is understood that the words "presenting" encompasses contexts in which elements of a real-world environment are visible to a user without being generated by a display device, such as in a heads-up display where the real-world elements are directly viewable through an optical lens.

In some embodiments, device 200 includes touch-sensitive surface(s) 209 configured to receive user inputs (touch and/or proximity inputs), such as tap inputs and swipe inputs or other gestures. In some embodiments, display(s) 214 and touch-sensitive surface(s) 209 together form touch-sensitive display(s) (e.g., a touch screen integrated with device 200 or external to device 200 that is in communication with device 200).

Image sensors(s) 206 optionally include one or more visible light image sensor, such as charged coupled device (CCD) sensors, and/or complementary metal-oxide-semiconductor (CMOS) sensors operable to obtain images of physical objects from the real-world environment. Image sensor(s) 206 optionally include one or more infrared (IR) or near infrared (NIR) sensors, such as a passive or an active IR or NIR sensor, for detecting infrared or near infrared light from the real-world environment. For example, an active IR sensor includes an IR emitter for emitting infrared light into the real-world environment. Image sensor(s) 206 optionally include one or more cameras configured to capture movement of physical objects in the real-world environment. Image sensor(s) 206 optionally include one or more depth sensors configured to detect the distance of physical objects from device 200. In some embodiments, information from one or more depth sensors can allow the device to identify and differentiate objects in the real-world environment from other objects in the real-world environment. In some embodiments, one or more depth sensors can allow the device to determine the texture and/or topography of objects in the real-world environment.

In some embodiments, device 200 uses CCD sensors, event cameras, and depth sensors in combination to detect the physical environment around device 200. In some embodiments, image sensor(s) 206 include a first image sensor and a second image sensor. The first image sensor and the second image sensor work together and are optionally configured to capture different information of physical objects in the real-world environment. In some embodiments, the first image sensor is a visible light image sensor, and the second image sensor is a depth sensor. In some embodiments, device 200 uses image sensor(s) 206 to detect the position and orientation of device 200 and/or display generation component(s) 214 in the real-world environment. For example, device 200 uses image sensor(s) 206 to track the position and orientation of display(s) 214 relative to one or more fixed objects in the real-world environment.

In some embodiments, device 200 optionally includes hand tracking sensor(s) 202 and/or eye tracking sensor(s) 212. Hand tracking sensor(s) 202 are configured to track the position/location of a user's hands and/or fingers, and/or motions of the user's hands and/or fingers with respect to the computer-generated environment, relative to the display(s) 214, and/or relative to another coordinate system. Eye tracking sensor(s) 212 are configured to track the position and movement of a user's gaze (eyes, face, and/or head, more generally) with respect to the real-world or computer-generated environment and/or relative to the display generation component(s) 214. In some embodiments, hand tracking sensor(s) 202 and/or eye tracking sensor(s) 212 are implemented together with the display(s) 214 (e.g., in the same device). In some embodiments, the hand tracking sensor(s) 202 and/or eye tracking sensor(s) 212 are implemented separate from the display(s) 214 (e.g., in a different device).

In some embodiments, the hand tracking sensor(s) 202 uses image sensor(s) 206 (e.g., one or more IR cameras, 3D cameras, depth cameras, etc.) that capture three-dimensional information from the real world including one or more hands. In some embodiments, the hands can be resolved with sufficient resolution to distinguish fingers and their respective positions. In some embodiments, one or more image sensor(s) 206 are positioned relative to the user to define a field of view of the image sensor(s) and an interaction space in which finger/hand position, orientation and/or movement captured by the image sensors are used as inputs (e.g., to distinguish from a user's resting hand or other hands of other persons in the real-world environment). Tracking the fingers/hands for input (e.g., gestures) can be advantageous in that it provides an input means that does not require the user to touch or hold input device, and using image sensors allows for tracking without requiring the user to wear a beacon or sensor, etc. on the hands/fingers.

In some embodiments, eye tracking sensor(s) 212 includes one or more eye tracking cameras (e.g., IR cameras) and/or illumination sources (e.g., IR light sources/LEDs) that emit light towards a user's eyes. Eye tracking cameras may be pointed towards a user's eyes to receive reflected light from the light sources directly or indirectly from the eyes. In some embodiments, both eyes are tracked separately by respective eye tracking cameras and illumination sources, and gaze can be determined from tracking both eyes. In some embodiments, one eye (e.g., a dominant eye) is tracked by a respective eye tracking camera/illumination source(s).

Device 200 optionally includes microphones(s) 213 or other audio sensors. Device 200 uses microphone(s) 213 to detect sound from the user and/or the real-world environment of the user. In some embodiments, microphone(s) 213 includes an array of microphones that optionally operate together (e.g., to identify ambient noise or to locate the source of sound in space of the real-world environment).

Device 200 optionally includes location sensor(s) 204 configured to detect a location of device 200 and/or of display(s) 214. For example, location sensor(s) 204 optionally includes a GPS receiver that receives data from one or more satellites and allows device 200 to determine the device's absolute position in the physical world.

Device 200 optionally includes motion and/or orientation sensor(s) 210 configured to detect orientation and/or movement of device 200 and/or display generation component(s) 214. For example, device 200 uses orientation sensor(s) 210 to track changes in the position and/or orientation of device 200 and/or display(s) 214 (e.g., with respect to physical objects in the real-world environment). Orientation sensor(s) 210 optionally include one or more gyroscopes, one or more accelerometers, and/or one or more inertial measurement units (IMUs).

It is understood that the architecture of FIG. 2A is an example architecture, but that system/device 200 is not limited to the components and configuration of FIG. 2A. For example, the device/system can include fewer, additional, or other components in the same or different configurations. In some embodiments, as illustrated in FIG. 2B, system/device 250 can be divided between multiple devices. For example, a first device 260 optionally includes processor(s) 218A, memory or memories 220A, and communication circuitry 222A, optionally communicating over communication bus (es) 208A. A second device 270 (e.g., corresponding to device 200) optionally includes various sensors (e.g., one or more hand tracking sensor(s) 202, one or more location sensor(s) 204, one or more image sensor(s) 206, one or more touch-sensitive surface(s) 209, one or more motion and/or orientation sensor(s) 210, one or more eye tracking sensor(s) 212, one or more microphone(s) 213 or other audio sensors, etc.), one or more display(s) 214, one or more speaker(s) 216, one or more processor(s) 218B, one or more memories 220B, and/or communication circuitry 222B. One or more communication buses 208B are optionally used for communication between the above-mentioned components of device 270. The details of the components for devices 260 and 270 are similar to the corresponding components discussed above with respect to device 200 and are not repeated here for brevity. First device 260 and second device 270 optionally communicate via a wired or wireless connection (e.g., via communication circuitry 222A-222B) between the two devices.

A computer-generated environment may be displayed using an electronic device (e.g., electronic device 100, device 200, device 250), including using one or more displays. The computer-generated environment can optionally include various graphical user interfaces ("GUIs") and/or user interface objects. As described herein, in some embodiments, the computer-generated environment includes a virtual agent. A virtual agent described herein refers to computer-generated character (e.g., an animated character) programmed to perform various behaviors. In some embodiments, a virtual agent may include artificial intelligence that allows the agent to perform decision-making as part of the various behaviors. In some embodiments, the virtual agent is a digital pet, digital assistant, or a digital companion. In some embodiments, a GUI can be used to animate motion of a virtual agent. In some embodiments, the virtual agent is characterized by movements/motions defined by certain parameters, and the characterizations of the movements can be used to animate the virtual agent. The characterization of virtual agent movement can include one or more go-to movements (goals to move to a destination/target), and each of the one or more go-to movements can include specifying a type of movement (e.g., movement function), a duration for the specified movement, and/or the movement's destination, among other possibilities. For example, a go-to movement can animate a virtual agent using a linear interpolation movement function between a keyframe at the starting point of the virtual agent and a keyframe at the end point of the motion, and the timing of movement can be defined by the start time/end time and/or duration. In some embodiments, the destination of the virtual agent's movement is a target, which may also be programmed to perform various movements or may be stationary. As such, a target described herein refers to computer-generated locator, which may be an object, a second virtual agent, a location within the computer-generated environment, etc. In some embodiments, the characterizations of virtual agent movement and/or the target are adjustable by a user (e.g., from one or more default characterizations).

Figure 3:
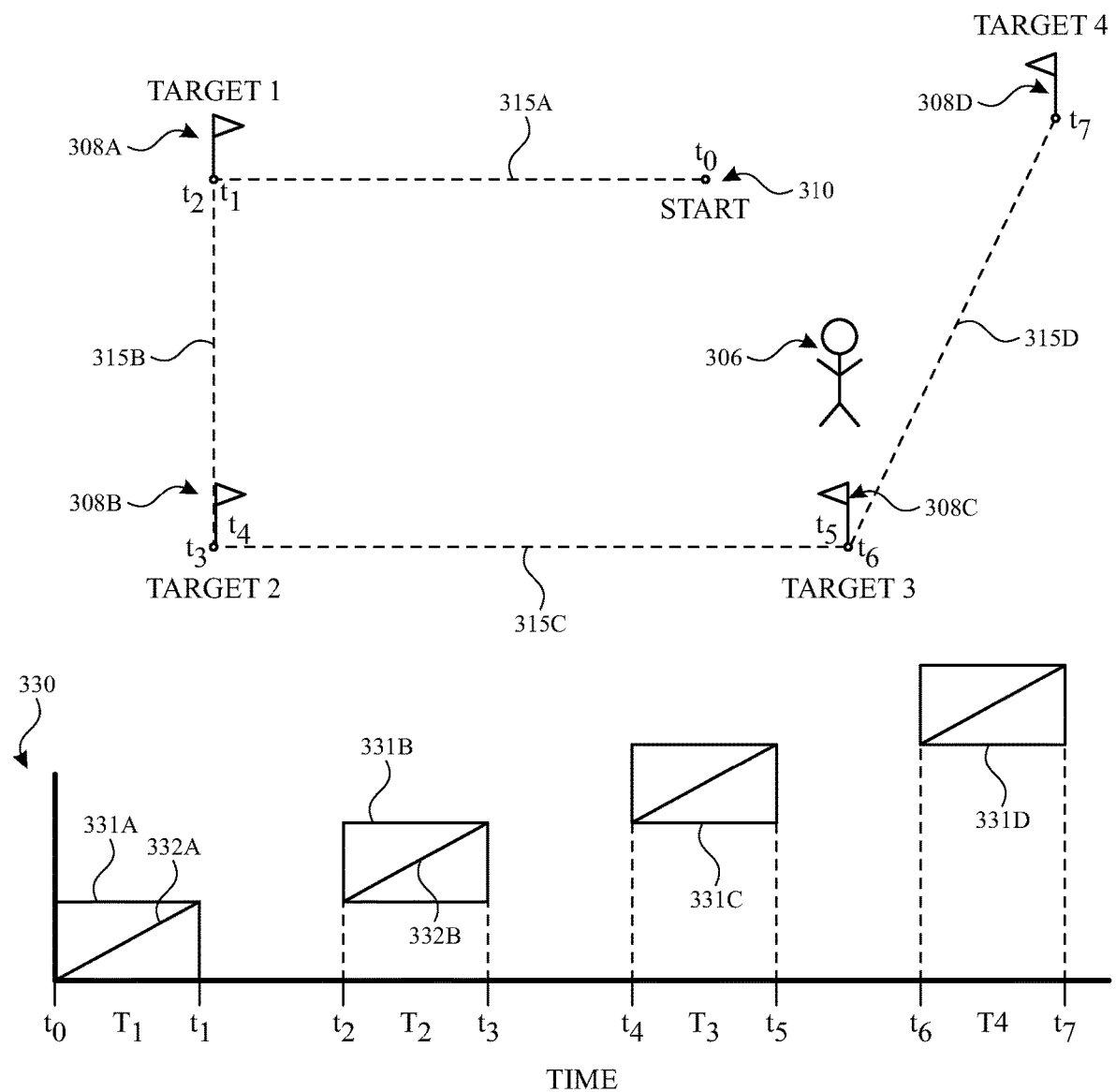
FIG. 3 illustrates an example of a virtual agent traveling to a plurality of stationary targets along a plurality of paths as defined by an example first-order animation technique according to some embodiments of the disclosure.

FIG. 3 illustrates an example of a virtual agent traveling to a plurality of stationary targets along a plurality of paths as defined by an example first-order animation technique according to some embodiments of the disclosure. FIG. 3 illustrates a computer-generated environment including the virtual agent 306 and the plurality of targets 308A-308D. FIG. 3 also illustrates the plurality of paths 315A-315D, which represent a plurality of first-order paths, each first-order path defined for a corresponding one of the targets. Each of the plurality of first-order paths can correspond to a path between a starting keyframe and an ending keyframe between which animation can be interpolated. In some embodiments, the plurality of paths can be displayed in the GUI to provide an indication of the animation path of the virtual agent. In some embodiments, the plurality of paths can be drawn during run-time within the GUI as the virtual agent movement is animated to illustrate the progress along the plurality of paths. In some embodiments, the plurality of paths can be displayed in a first representation in the GUI to provide an indication of the animation path of the virtual agent, and then the plurality of paths can be drawn in a second representation during run-time. For example, the path can be represented as a dashed line prior to executing an animation of the virtual agent, and the path can be traced and represented with a solid line during run-time. It is understood that other differences in the representation are possible (e.g., changing color, line thickness, etc. of the representation before run-time and for run-time). In some embodiments, the plurality of paths shown in FIG. 3 are not displayed on-device in the GUI, but they are illustrated here for case of understanding.

As shown, FIG. 3 also illustrates a plurality of graphical elements 331A-331D (also referred to as animation clips) representative of a plurality of movement goals of the virtual agent on an example timeline 330. Each of the graphical elements can represent a start time for a movement, an end time for the movement, a duration of movement, and/or a movement function. For example, the position of the graphical element along the horizontal axis (labeled Time) of timeline 330 can provide an indication of the start time and the end time of the movement, as represented by time markers ($t_0$-$t_7$). The time markers of the timeline 330 are also reflected along the plurality of paths 315A-315D, corresponding to particular moments in time at which the virtual agent 306 begins movement toward and reaches targets 308A-308D. It should be understood that the time markers refer to any suitable unit of time, such as, seconds, minutes, milliseconds, and so forth, as applicable.

As described herein, a virtual agent (e.g., an animated character) may be animated to perform a particular behavior/function, such as animating motion of the virtual agent to targets along the plurality of paths. In some embodiments, the targets may be stationary/static (e.g., non-moving within the computer-generated environment). In the example shown in FIG. 3, a virtual agent 306 is animated (e.g., following a first-order animation path) to travel to and between a plurality of targets 308A-308D, such that the virtual agent travels from an initial position 310 (e.g., start point) to a first target (Target 1) 308A, then from the first target 308A to a second target (Target 2) 308B, and so on. For visualization purposes, the path resulting from the aforementioned plurality of movements is displayed in FIG. 3, such that a first path 315A (also referred to as "a first-order path" or "a target-defined path") can represent the movement of the virtual agent 306 from the initial position 310 to the first target, the second path 315B can represent the movement of the virtual agent 306 from the first target 308A to the second target 308B, the third path 315C can represent the movement of the virtual agent 306 from the second target 308B to the third target 308C, and the fourth path 315D can represent the movement of the virtual agent 306 from the third target 308C to the fourth target 308D.

Per the example above, the virtual agent 306 may travel an overall path originating at the initial position 310 and ending at the fourth target (Target 4) 308D. As shown, on the timeline 330, an initial time marker to represents a start to the animated motion (also referred to as an "animation," or simply as "motion") of the virtual agent 306 between the initial position 310 and the first target 308A. As an example, time marker $t_0$-$t_7$ are optionally illustrated within the computer-generated environment, as shown, to provide visualization of the point in time at which a particular movement of the virtual agent 306 has occurred or will occur for the animation. It should be understood that the time markers $t_0$-$t_7$ may or may not be displayed within the computer-generated environment or the corresponding timeline 330. As shown, once the virtual agent 306 reaches the first target 308A, as illustrated by completed path 315A, the virtual agent 306 has completed the first animated movement/sequence, as defined by graphical element 331A, for example. As shown in the timeline 330, the movement of the virtual agent 306 between the initial position 310 and the first target 308A can occur over a first period $T_1$ defined by start and end time markers to and $t_1$, respectively. During this first period $T_1$, the virtual agent 306 travels using a linear interpolation type of motion function to the first target 308A (along the path), as indicated by linear motion indicator 332A between opposite corners of the rectangular graphical element 331A. As illustrated in FIG. 3, a pause or break in motion of the virtual agent 306 may occur after the completion of the first motion (and before initiating a second motion), corresponding to a pause or break along the timeline 330 (e.g., between time markers $t_1$ and $t_2$).

As shown in FIG. 3, at time marker $t_2$, the virtual agent 306 may initiate the second animated motion, wherein the virtual agent 306 travels from the first target 308A to the second target 308B, generating a second target-defined path 315B, for example. As described above, the second motion of the virtual agent 306 may occur over a second period $T_2$ defined by start and end time markers $t_2$ and $t_3$, respectively. Likewise, the virtual agent 306 may temporarily cease motion after completing the second motion, such that a pause occurs after the third time marker $t_3$, for example. As above, the second motion, defined according to graphical element 331B, follows a linear interpolation type of motion function, as indicated by motion indicator 332B, for example. Continuing along timeline 330, the virtual agent 306 may perform a third motion, generating a third target-defined path 315C, from the second target 308B to the third target 308C, and finally, may perform a fourth motion, generating a fourth target-defined path 315D, from the third target 308C to the fourth target 308D. As shown via the graphical elements 331A-331D in timeline 330, the virtual agent 306 can be animated to move to the four targets by specifying four motions/movements according to a linear interpolation along a linear path over four periods $T_1$-$T_4$, for example.

Referring to the completed path (illustrated by the plurality of target-defined paths 315A-315D), it can be observed that each transition (e.g., between reaching Target 1 and initiating travel to Target 2) occurs sharply with the virtual agent reorienting its direction at each target before beginning movement to the next target. Such sharp movements between the motion transitions may create a jagged motion including sharp changes in trajectory, which may be undesirable because such animations appear unnatural compared with more gradual directional changes in motion. Additionally, because each individual motion (e.g., travel between targets 308A and 308B) of the virtual agent 306 is animated, the pauses or breaks in between a first motion end time and a second motion start time (e.g., between $t_1$ and $t_2$) create a physical pause in the motion of the virtual agent 306, as described above. Such pauses in the animation may also be unnatural for a sequence of different motions. Such sharp transitions and physical pauses in the virtual agent's motion may be undesirable when seeking to animate a more natural, continuous path of motion. For instance, the sharp transitions may appear artificial. Thus, generating a more natural continuous path of motion can require the use of more complex animation design to manually generate a more natural curved spline for interpolation and/or the use of a large number of keyframes, for example, to enable a smooth path of motion, which can be time-consuming and/or difficult for the average user (e.g., animator, designer). Additionally or alternatively, the animator may need to carefully tune the timing of the keyframes, which may be time-consuming and/or difficult.

Figure 4:
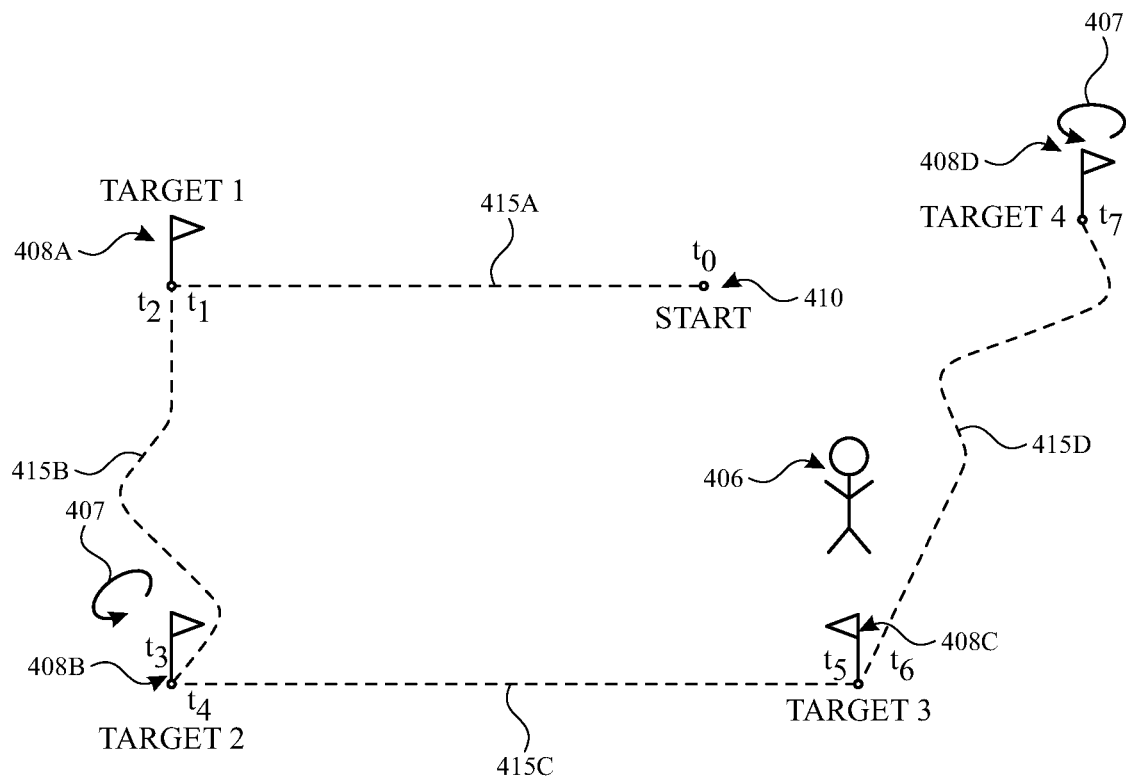
FIG. 4 illustrates an example of a virtual agent traveling to a plurality of stationary or dynamic targets along a plurality of paths as defined by an example first-order animation technique according to some embodiments of the disclosure.

Although FIG. 3 illustrates stationary targets, in some embodiments, some or all of the targets can be dynamic. FIG. 4 illustrates an example of a virtual agent traveling to a plurality of stationary or dynamic targets along a plurality of paths as defined by an example first-order animation technique according to some embodiments of the disclosure. FIG. 4 illustrates a computer-generated environment including the virtual agent 406 and the plurality of targets 408A-408D. FIG. 4 also illustrates the plurality of paths 415A-415D, which represent a plurality of first-order paths, each first-order path defined for a corresponding one of the targets. In some embodiments, the plurality of paths 415A-415D can be displayed (or not displayed) in the GUI in a similar manner as described for paths 315A-315D, and not repeated here for brevity. As shown, FIG. 4 also illustrates a plurality of time markers (e.g., $t_1$ and $t_2$) along the plurality of paths 415A-415D, corresponding to particular moments in time at which the virtual agent 406 begins movement toward and reaches targets 408A-408D (e.g., corresponding to timeline 330 defining movement between the four targets represented by graphical elements 331A-331D).

In a similar manner as described previously with reference to FIG. 3, virtual agent 406 may travel an overall path originating at the initial position 410 and ending at the fourth target (Target 4) 408D. Unlike FIG. 3 which illustrates four stationary targets 308A-308D, in the example shown in FIG. 4, a first target (Target 1) 408A and a third target (Target 3) 408C can be stationary, whereas a second target (Target 2) 408B and a fourth target (Target 4) 408D of the plurality of targets 408 are dynamic targets. As such, the second target 408B and the fourth target 408D may each also move within the computer-generated environment during run-time (e.g., rather than remaining at a fixed location). The dynamic nature of the target is illustrated in FIG. 4 by the rotation arrow 407 indicative of a rotation or swivel movement of the second target 408B and the fourth target 408D, and is indicated by the virtual agent reaching the dynamic targets 408B and 408D at different positions within the computer-generated environment during the animation. Although a rotation movement of the dynamic targets are shown in FIG. 4, the movement of the dynamic targets can be different, and need not be geometric in nature.

In a similar manner as described with respect to FIG. 3, the virtual agent 406 can be animated to travel sequentially along a plurality of individual paths of motion within the computer-generated environment. As shown in FIG. 4, the virtual agent 406 may initially be positioned at the initial position 410, and may begin traveling toward the first target 408A at time to. As the virtual agent 406 travels toward the first target 408A, the virtual agent's path of motion may be represented by path 415A, for example. The virtual agent's motion may be a linear path and may use a linear interpolation type of motion function as indicated by linear motion indicator 322A within graphical element 331A in timeline 330. Upon reaching the first target 408A at time marker $t_1$, the virtual agent 406 pauses as the first animated motion is completed along path 415A. Upon initiation of a second animated motion at time $t_2$, for example, the virtual agent 406 may begin traveling from the first target 408A toward the second target 408B. As mentioned above, the second target 408B may be moving (e.g., in a circular path) as the virtual agent 406 travels toward the second target 408B. As such, the target-defined path 415B created between the first target 408A and the second target 408B may be nonlinear (though the interpolation type of motion function may still be linear as indicated by graphical element 331B). For example, the virtual agent 406 is animated to travel to the second target's position, but because the second target is moving, the "position" from the virtual agent's perspective can be changing. Thus, the path of motion (e.g., displayed in real time) of the virtual agent 406 during travel may be non-linear, as illustrated by the nonlinear shape of the second path 415B, due to the virtual agent reorienting its heading as the dynamic target moves.

Continuing the example shown in FIG. 4, at the completion of the second animated motion (e.g., along the second path 415B) at time $t_3$, the virtual agent 406 may pause in motion before an initiation of a third animated motion, for example. The virtual agent 406 may begin traveling from the second target 408B to the third target (Target 3) 408C according to the third animated motion at time $t_4$. The third animated motion may result in the creation of a third target-defined path 415C, as shown, extending between the second target 408B and the third target 408C, and ending at time $t_5$. The virtual agent 406 may travel a fourth and final path (shown by 415D) between the third target 408C and the fourth target 408D. As similarly described above with reference to the second target 408B, the fourth target 408D may be dynamic and moving, such that as the virtual agent 406 travels toward the fourth target 408D (beginning at time $t_6$), the resulting path 415D is nonlinear, and such that the animation of the virtual agent 406 appears unnatural.

Referring to the completed path (illustrated by the plurality of target-defined paths 415A-415D), it can be observed that each transition (e.g., between reaching Target 1 and initiating travel to Target 2) occurred sharply with the virtual agent reorienting its direction at each target before beginning movement to the next target. Such sharp transitions may create a jagged motion including sharp changes in trajectory, which may be undesirable because such animations appear unnatural compared with more gradual directional changes in motion. Moreover, as mentioned above, the animated paths of motion toward dynamic targets result in nonlinearly shaped paths with large deviations from a linear path (e.g., compared to the linear path to a stationary target). These large deviations in the animation paths can appear unnatural. Additionally, because each individual motion (e.g., travel between targets 408A and 408B) of the virtual agent 406 is animated separately, the pauses or breaks in between a first motion end time and a second motion start time (e.g., between $t_1$ and $t_2$) create a physical pause in the motion of the virtual agent 406, which may also be unnatural for a sequence of different motions. Such sharp transitions, nonlinear trajectories and physical pauses in the virtual agent's motion may be undesirable when seeking to animate a more natural, continuous path of motion. Thus, generating a more natural and continuous path of motion can require the use of more complex animation design to manually generate a more natural curved spline for interpolation and/or use the use of a large number of keyframes, for example, to enable a smooth path of motion, which can be time-consuming and/or difficult for the average user. Additionally or alternatively, the user may need to carefully tune the timing of the keyframes, which may be time-consuming and/or difficult.

Figure 5A:
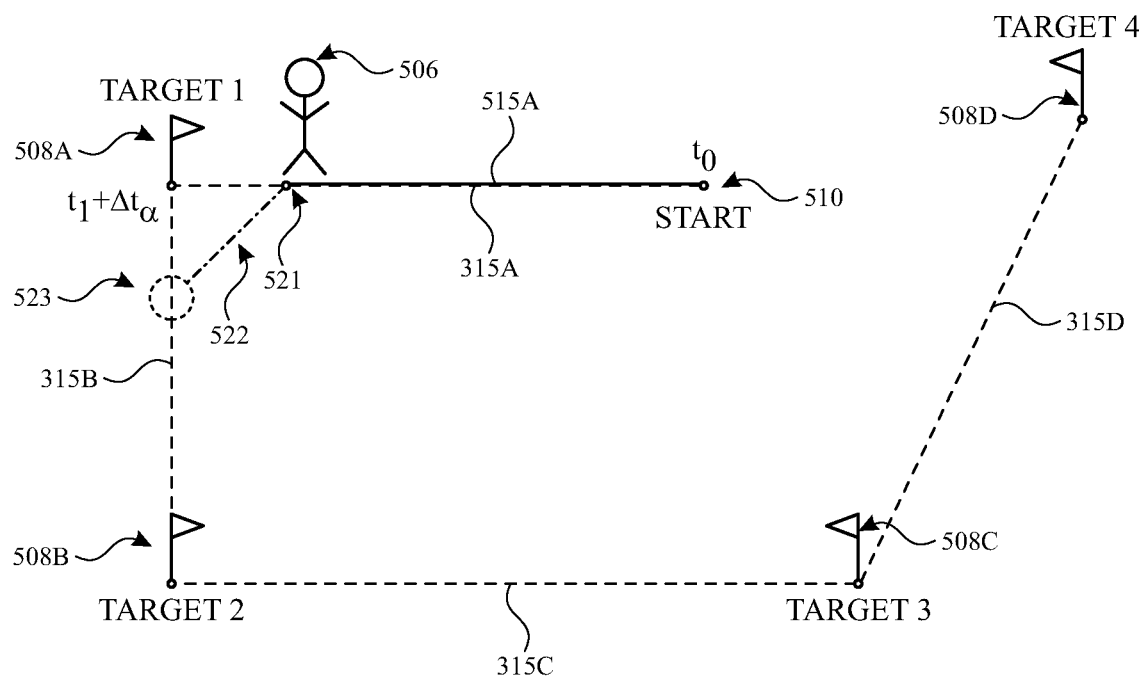
FIGS. 5A-5C illustrate an example of a virtual agent traveling to the plurality of stationary targets along a plurality of paths as defined by a goal-based, second-order animation technique according to some embodiments of the disclosure.
Figure 5B:
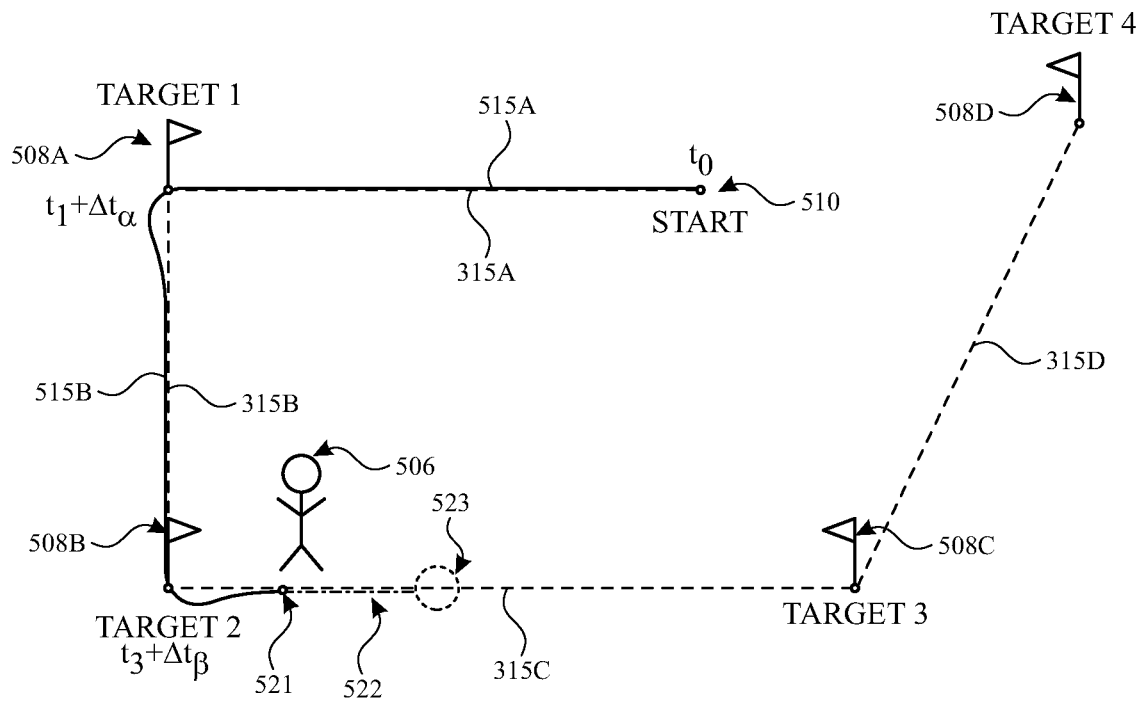
Figure 5C:
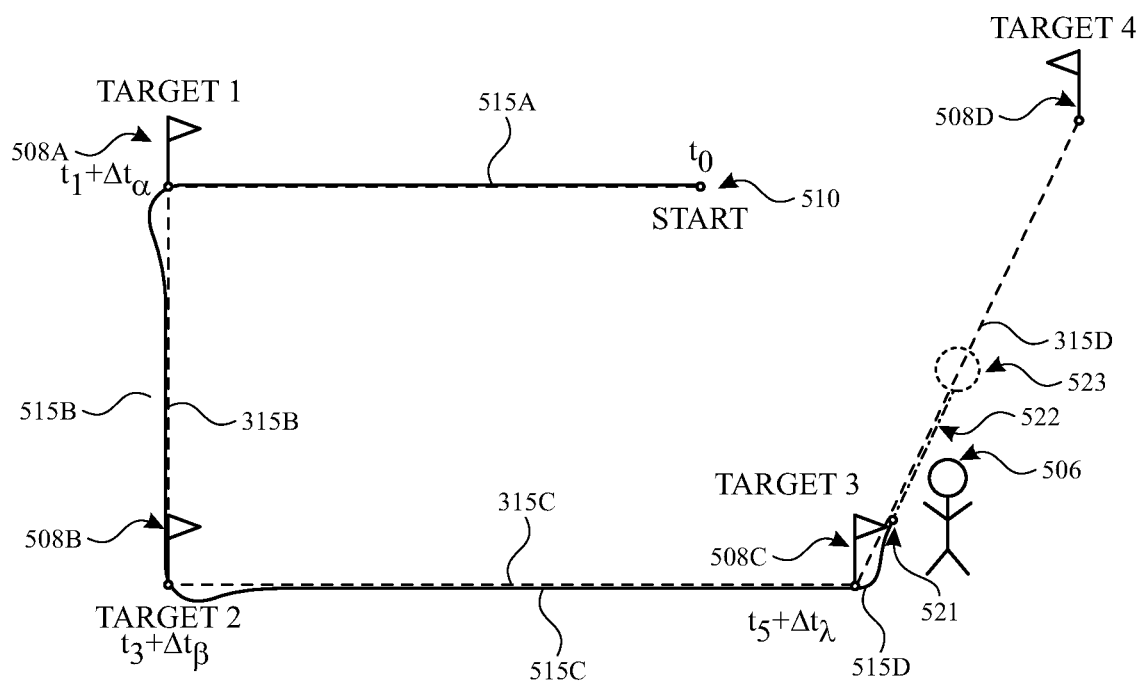

In some embodiments, goal-based animation can be used to generate more natural animations (e.g., smoother transitions, reduced pauses). In some embodiments, the goal-based animation is a second-order animation of one or more first-order animations (goals) of movement to one or more targets. The first-order animations can refer to the target-defined paths corresponding to the graphical elements 331A-331D and representative of a plurality of movement goals of the virtual agent. As a result, the second-order animation can be alternatively expressed as goal-based animation as it interpolates the first-order animations/goals. The overall path of the virtual agent for the second-order animation of one or more goals may be referred to herein as an interpolated animation path. FIGS. 5A-5C illustrate an example of a virtual agent traveling to the plurality of stationary targets along a plurality of paths as defined by a goal-based animation technique (e.g., a second-order animation) according to some embodiments of the disclosure. Although illustrated and often described as a plurality of paths (or target-defined paths), the plurality of paths can also be referred to collectively as an interpolated animation path. For comparison purposes, the plurality of paths 515A-515D for the second-order animation are illustrated in conjunction with the plurality of paths 315A-315D for the first-order animation of goals. FIGS. 5A-5C illustrate a computer-generated environment, wherein the motions of a virtual agent 506 are depicted sequentially over time (e.g., corresponding to exemplary timeline 330 of FIG. 3 as represented by the plurality of graphical elements 331A-331D and motion indicators 322A-322D).

As described previously above when referring to FIG. 3, a virtual agent (e.g., 306) may be animated using a motion-based approach, such that a motion of the virtual agent from a first position (e.g., initial position 310) to a second position (e.g., Target 1) exemplifies a first-order animation curve for a first-order animation. As will be illustrated below, a goal-based animation approach introduces an interpolation of the one or more first order animations. The interpolation can be particularly apparent in the form of a smooth curve between any two sequential first-order movements (e.g., traveling from the start point to Target 1 (movement 1), then traveling from Target 1 to Target 2 (movement 2)), that would otherwise generate a sharp transition. Accordingly, rather than animating the virtual agent moving from an initial position to a target as dictated by a first-order path of FIG. 3, a movement along an interpolated path is defined by interpolating the first-order path(s) to generate a second-order path(s). Another way to conceptualize the interpolated path is to consider the virtual agent animated to travel not to the target, but rather to be animated to go to the goal. The goal, which can be viewed as representing as a position along the first-order animation path (in a snapshot in time), but continuously moving to reach the target along the first-order animation path. Animating the virtual agent moving toward the goal can also be viewed through a link between the virtual agent and the relative position along the first-order path of the goal as it moves in a first-order animation path toward the goal. It should be understood that, in some embodiments, the animation of the goal is not illustrated to the user (though, in some embodiments, it may optionally be illustrated, but having a different appearance than the second-order animation). For example, the virtual agent may have a physics-based relationship (e.g., a spring relationship or rubber-band relationship), such that the virtual agent's motion is optionally delayed in time behind the relative position of the goal. As a result of the link between the virtual agent and the relative position along the goal, the second-order animation path can have a resulting trajectory of motion among the second plurality of targets that is smoothed (e.g., via smooth transitions), such that the motion of the virtual agent appears, during display of the animation (e.g., during run-time), more realistic and continuous in real time (e.g., because the optional delay in time shrinks the time between the conclusion of a first of the go-to motion and the start of the next go-to motion).

FIG. 5A illustrates an example of the virtual agent 506 traveling over a first period between the initial position 510 and the first target (Target 1) 508A of the plurality of targets 508A-508D as defined by the goal-based animation technique disclosed herein. As described above, a plurality of movements may be defined instructing the virtual agent 506 to travel among the plurality of targets 508A-508D. Accordingly, in this example, a first movement is defined instructing the virtual agent 506 to travel from the initial position 510 to the first target 508A, a second movement is defined instructing the virtual agent 506 to travel to the second target 508B, a third movement is defined instructing the virtual agent 506 to travel to the third target 508C, and a fourth movement is defined instructing the virtual agent 506 to travel to the fourth target 508D (e.g., performed sequentially according to the graphical elements 331A-331D in the timeline 330 of FIG. 3). As an example, the defining the first, second, third, and fourth movements of the plurality of movements may include defining a plurality of parameters characterizing the motion of the virtual agent 506 that can be used to represent first-order animations and/or goals. As will be described in more detail below when referring to FIGS. 7A-7B, the plurality of parameters may include a start time (e.g., $t_0$), a duration (e.g., $T_1$), a target of movement (e.g., Target 1), a movement function (e.g., linear interpolation motion) and/or an inertia parameter (i.e., a representation of the amount of interpolation used to generate the second-order animation path or a representation of the strength of the link between the virtual agent and the animation first-order goal).

As shown in FIG. 5A, at time to, the virtual agent 506 may begin traveling from the initial position 510 toward the first target 508A in accordance with the first defined movement. It should be understood that, as described herein, each defined movement exemplifies an interpolation of one or more first-order animations of the virtual agent toward one or more targets. In the snapshot of FIG. 5A, the virtual agent 506 is displayed along the first target-defined path 515A of the overall interpolated path. As shown for visualization purposes for ease of description (e.g., and not as an element of the computer-generated environment), the virtual agent's position at the snapshot in time of FIG. 5A is represented by dot 521. Additionally, as described above, the position of the continuously moving goal along a first-order path in the snapshot is represented by circle 523. Finally, as shown, the link between the virtual agent's position at dot 521 and the goal at circle 523 is represented by line 522. As mentioned above, the goal and therefore circle 523 may continuously move according to the defined plurality of first-order movements, such that the motion of the virtual agent 506 is goal-oriented, as opposed to directly target-oriented, as shown previously in FIGS. 3-4, for example. In this embodiment, the interpolation of first-order paths 315A-315B and/or the link represented by line 522 draws the virtual agent 506 toward the goal at circle 523 and causes a smoother curve for the transition between movement toward the first target and movement toward the second target. In some embodiments, the link and/or amount of interpolation may be characterized as a physical spring relationship between the virtual agent and the animated goal, and a springiness value associated with the spring may thus be selectable (i.e., user-defined) to result in a desired level of "smoothness" of virtual agent motion, as will be described in more detail herein. Thus, as shown in FIG. 5A, the virtual agent 506 may continuously travel toward the goal (e.g., represented by circle 523 in the snapshot of FIG. 5A), shown beginning the second go-to goal along a second first-order path (e.g., between Target 1 and Target 2) defined by path 315B, such that the virtual agent transitions smoothly between the two go-to movements (e.g., before and after Target 1) when the animation is displayed along the smoothed interpolated path.

As an example, the use of interpolation to animate the virtual agent's motion according to the defined plurality of movements may introduce an inertial delay resulting from the spring relationship between the virtual agent 506 and the goal (e.g., represented by circle 523). As shown in FIG. 5A, the virtual agent 506 may complete the first movement (i.e., reach the first target 508A) at time $t_1+\Delta t_\alpha$, where $\Delta t_\alpha$ represents the additional travel time that may be introduced by the inertial delay (assuming a non-zero inertial delay), rather than arriving at $t_1$ as indicted by the period $T_1$ indicated in the timeline for FIG. 3. As an example, a value of the induced inertial delay may be selectable/controllable via the inertia parameter defining the amount of interpolation, wherein the inertial delay and the inertia parameter exhibit a direct relationship, for example. As will be described in more detail later, the inertial delay may compensate for the pauses or breaks in motion that would otherwise occur using first-order animation techniques (e.g., as described with reference to FIGS. 3-4) when there are pauses between movements as shown in the timeline 330. It should be understood that, although the relationship between the virtual agent 506 and the goal at any instance in time may, mathematically, be characterized via a spring-based model, other models may be used as well, such as, for example, scale-based models or rotation-based models.

FIG. 5B illustrates and continues the example of FIG. 5A, the virtual agent 506 now having traveled from the first target 508A to the second target (Target 2) 508B of the plurality of targets 508A-508D as defined by the goal-based animation technique disclosed herein. The virtual agent 506 may be animated to continuously move to a moving goal (e.g., represented by circle 523), such that as the virtual agent 506 transitions from one go-to movement to the next, the animated path of movement appears to be smooth and continuous. As shown in the snapshot of FIG. 5B, the virtual agent 506 has traveled from the initial position 510 to the first target 508A, thus completing the first movement, and has traveled from the first target 508A to the second target 508B, thus completing the second movement, and generating a second target-defined path 515B of the plurality of target-defined paths 515A-515D, for example.

As described above, the virtual agent 506 may, via a plurality of first-order animations, travel between sequential pairs of targets (e.g., Target 1 and Target 2) along an interpolated path of motion by moving toward a goal (e.g., represented by circle 523) via the link (e.g., represented by line 522), for example. As shown in FIG. 5B, the virtual agent 506 may reach the second target 508B, thus completing the second movement at time $t_3+\Delta t_\beta$, where $\Delta t_\beta$ represents a second inertial delay (assuming a non-zero inertial delay) incurred by the interpolated motion of the virtual agent 506 as the virtual agent 506 transitions from completing the second movement to initiating the third movement, rather than arriving at $t_3$ as indicated by the period $T_2$ in the timeline 330 for FIG. 3. As shown in FIG. 5B, the virtual agent 506 begins to travel according to the third movement, defining a path (e.g., similar to with path 315C) between the second target 508B and the third target 508C. As shown in the snapshot, the virtual agent 506 may travel toward the third target 508C by continuously moving to a position of the goal represented by circle 523, as described above.

FIG. 5C illustrates and continues the example of FIG. 5B, the virtual agent 506 now having traveled from the second target 508B to the third target (Target 3) 508C of the plurality of targets 508A-508D as defined by the goal-based animation technique disclosed herein. The virtual agent 506 may be animated to continuously moving toward a goal represented by circle 523, such that as the virtual agent 506 transitions from one go-to movement to the next, the animated path of movement appears to be smooth and continuous along the interpolated path of motion. As shown in the snapshot of FIG. 5C, the virtual agent 506 has traveled from the second target 508B to the third target 508C, thus completing the third go-to movement, and generating a third target-defined path 515C of the second plurality of target-defined paths 515A-515D.

As described above, the virtual agent 506 may move to a moving goal (e.g., represented by circle 523) following the plurality of first-order animations via the link (e.g., represented by line 522), so as to travel between sequential pairs of targets (e.g., Target 2 and Target 3), for example, along the interpolated path of motion. As shown in FIG. 5C, the virtual agent 506 may reach the third target 508C, thus completing the third movement, at time $t_5+\Delta t_\lambda$, where $\Delta t_\lambda$ represents a third inertial delay (assuming a non-zero inertial delay) incurred by the interpolated motion of the virtual agent 506 as the virtual agent 506 transitions from the third movement to the fourth movement, rather than arriving at $t_5$ as indicated by the period $T_3$ in the timeline 330 for FIG. 3. As shown in FIG. 5C, the virtual agent 506 begins to travel according to the fourth go-to movement, defining a path (e.g., similar to path 315D) between the third target 508C and the fourth target 508D, for example. As shown, the virtual agent 506 may travel toward the fourth target 508D by continuously moving to a position of the goal (e.g., represented by circle 523), as described above. The virtual agent 506 may continue traveling according to the fourth movement until the virtual agent 506 reaches the fourth target 508D, thus completing the fourth movement, and thus completing (i.e., displaying) the animation of the movement of the virtual agent 506 along the interpolated animation path defined above (e.g., defined by the second plurality of target-defined paths 515A-515D).

The goal-oriented animation technique disclosed herein and illustrated and described with respect to FIGS. 5A-5C may improve upon the first-order animation of movement illustrated in FIG. 3. Referring to the interpolated animation path (illustrated by the second plurality of target-defined paths 515A-515D), it can be observed that between each transition (e.g., after reaching Target 1 and initiating travel to Target 2), the transition occurred smoothly (e.g., in a curved fashion that more gradually changes direction). The interpolated animation path of FIGS. 5A-5C exhibits an overall smooth and continuous trajectory, which appears more realistic and natural during display of the animation of the movement along the animation path.

In addition, interpolating the movements can result in a more fluid animation with shorter or no pauses between the different targets. For example, an inertial delay for the virtual agent moving toward a goal rather than simply being animated moving toward the target on a first-order path can result in delays (e.g., $\Delta t_\lambda$). The resultant inertial delay in arrival time, which may be adjustable via the selectively defined inertia parameter, for example, shrinks or eliminates the pauses between the end of one motion and the start of the next motion in the virtual agent's motion. For example, referring back to FIG. 3, following traditional first-order animation paths, the virtual agent 306 reaches the first target 308A at time $t_1$ and pauses before traveling toward the second target 308B at time $t_2$. Using the disclosed goal-based animation technique, as shown in FIG. 5A, the virtual agent 506 moves toward the goal (e.g., represented by circle 523), rather than strictly traveling to the first target 508A, such that when the virtual agent 506 visually reaches the first target 508A, the time is $t_1+\Delta t_\alpha$, thus more closely synchronizing the moment the virtual agent 506 reaches the first target 508A with the moment the virtual agent 506 begins traveling toward the second target 508B. Thus, in this way, during displaying of the animation of the movement, the virtual agent 506 "rounds the corner" upon reaching the first target 508A, as shown in FIG. 5B, for example, which thus reduces or eliminates the traditional pause between the end of the first movement and the start of the second movement.

Thus, as outlined above, advantages of the goal-based animation method disclosed herein include the generation of a more natural animation by smoothing the overall animation path using a second-order interpolation as compared with multiple first-order animation and reducing or eliminating pauses between multiple first-order animations. Additionally, the goal-based animation method disclosed herein allows for animating more natural and realistic smooth go-to animations to one or more stationary targets in a simple manner using a plurality of first-order animation parameters, which considerably reduces the effort and time-consumption on the part of the user.

Figure 6A:
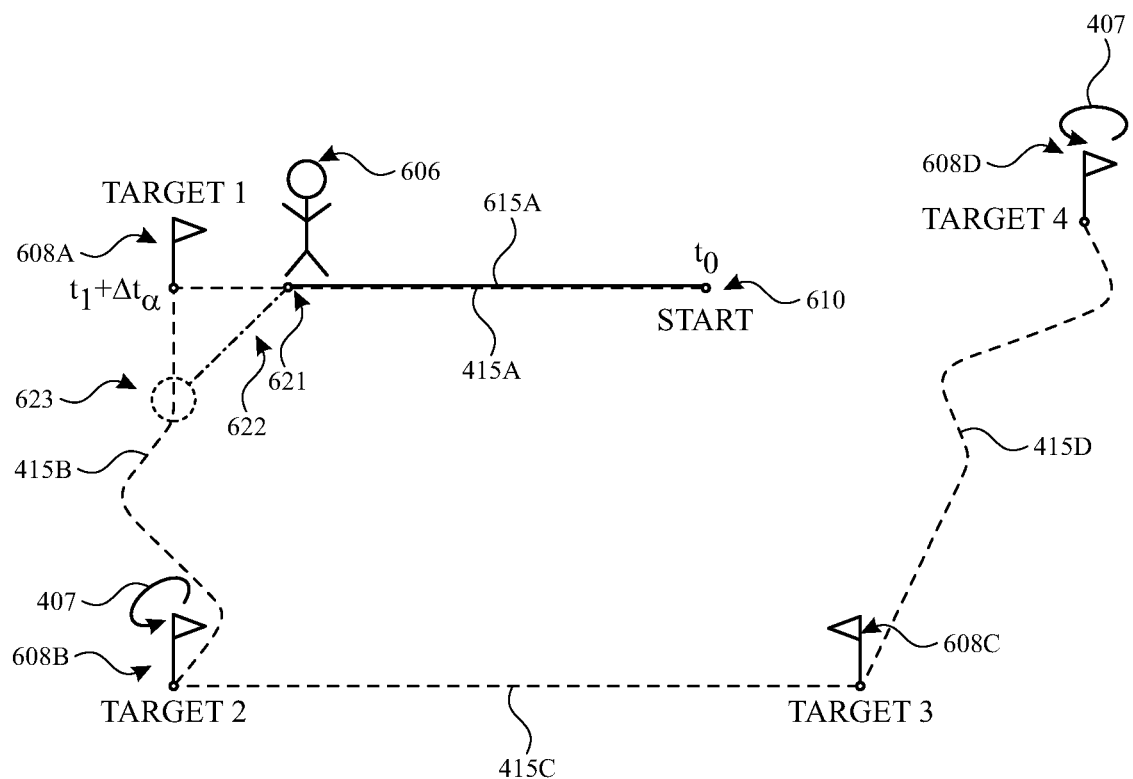
FIGS. 6A-6C illustrate examples of a virtual agent traveling to the plurality of stationary or dynamic targets along a plurality of paths as defined by a goal-based, second-order animation technique according to some embodiments of the disclosure.
Figure 6B:
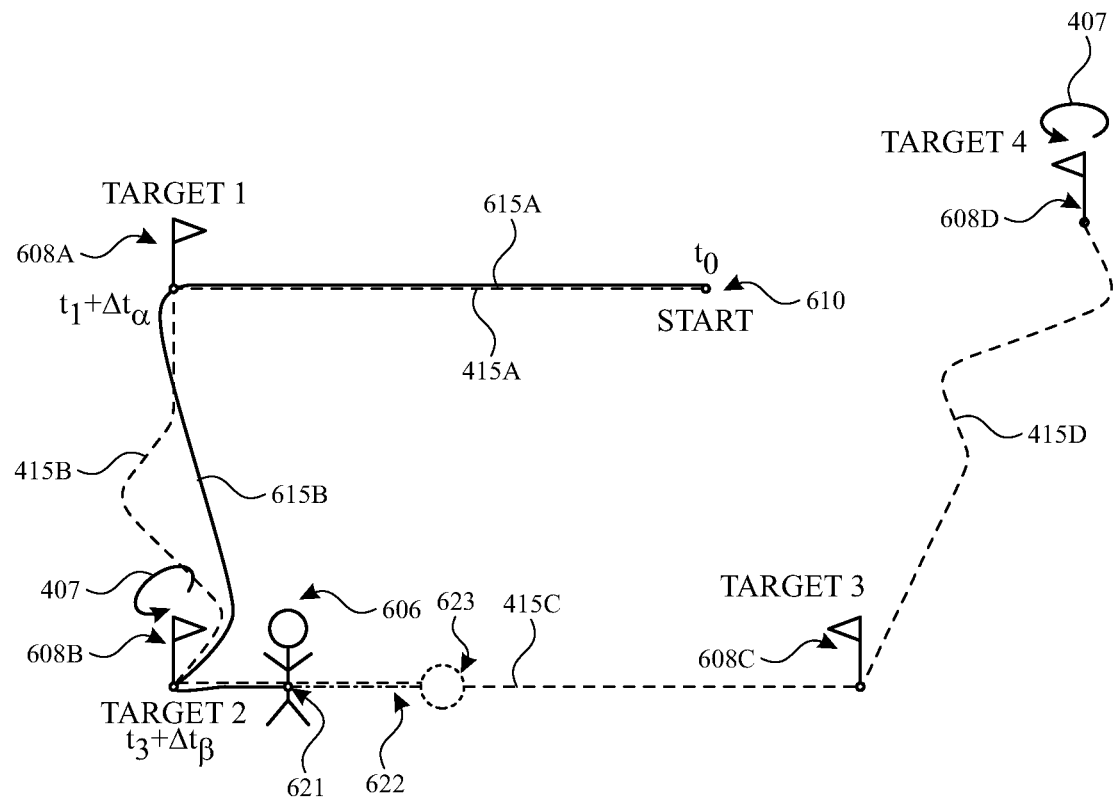
Figure 6C:
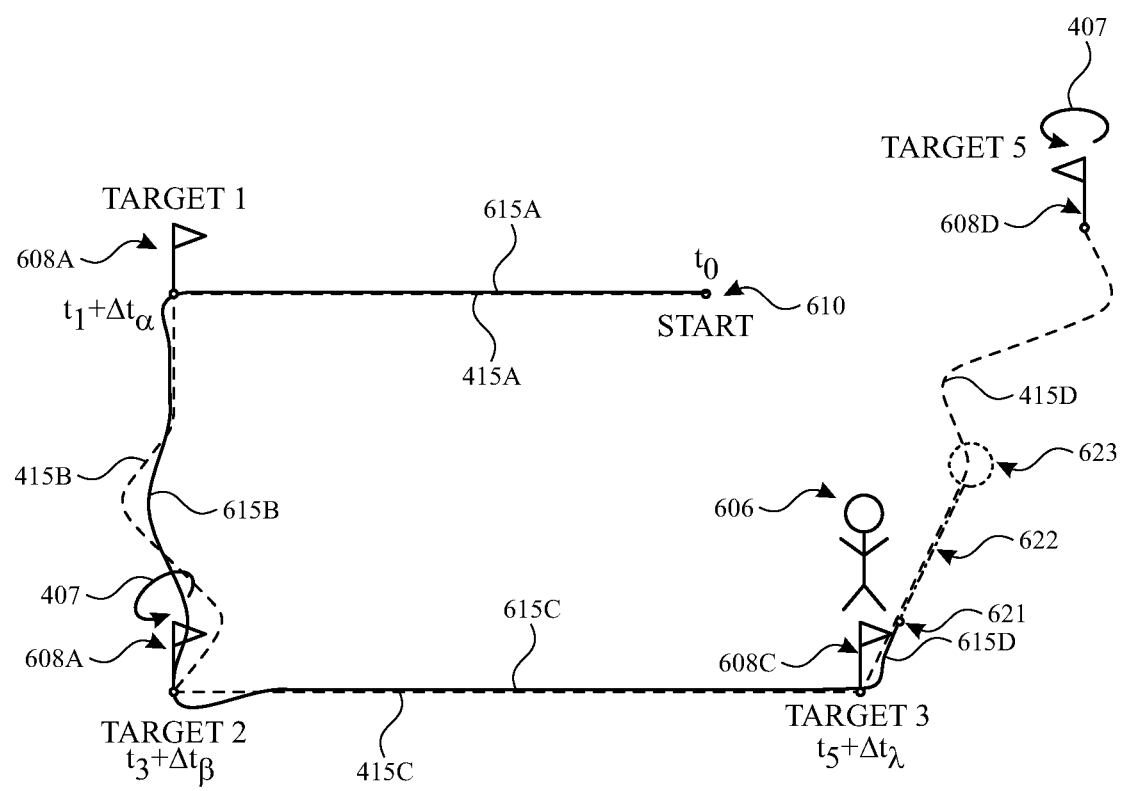

In some embodiments, a second-order animation of one or more first-order animations can be applied to one or more targets, wherein the targets are stationary or dynamic targets. The first-order animations can refer to the target-defined paths corresponding to the graphical elements 331A-331D and representative of a plurality of movement goals of the virtual agent. As above, the overall path of the virtual agent for the second-order animation of one or more goals may be referred to below as an interpolated animation path. FIGS. 6A-6C illustrate examples of a virtual agent traveling to the plurality of stationary or dynamic targets along a plurality of paths (or an interpolated animation path) as defined by a goal-based animation technique (e.g., a second-order animation) according to some embodiments of the disclosure. For comparison purposes, the plurality of paths 615A-615D for the second-order animation are illustrated in conjunction with the plurality of paths 415A-415D for the first-order animation of goals. FIGS. 6A-6C illustrate a computer-generated environment, wherein the motions of a virtual agent 606 are depicted sequentially over time (e.g., corresponding to the exemplary timeline 330 of FIG. 3 as represented by the plurality of graphical elements 331A-331D and motion indicators 322A-322D).

As described previously above when referring to FIG. 4, a virtual agent (e.g., 406) may be animated using a motion-based approach, such that a motion of the virtual agent from a first position (e.g., initial position 410) to a second position (e.g., Target 1) exemplifies a first-order animation curve. A goal-based animation approach introduces an interpolation of the one or more first-order animations. The interpolation appears as a smoother curve that avoids sharp transitions for stationary targets and/or reduces how far the virtual agent departs from a linear path for moving targets. Accordingly, rather than animating the virtual agent to move from an initial position to a target as dictated by a first-order path of FIG. 4, a movement along an interpolated path is defined by the interpolating the motion between the initial position and the target, such that the motion of the virtual agent appears, during display of the animation, more realistic and continuous.

FIG. 6A illustrates an example of the virtual agent 606 traveling over a first period between the initial position 610 and the first target (Target 1) 608A of the plurality of targets 608 as defined by the goal-based animation technique disclosed herein. As described above, a plurality of movements may be defined instructing the virtual agent 606 to travel sequentially to each of the plurality of targets 608A-608D (e.g., according to the graphical elements 331A-331D in the timeline 330 of FIG. 3). Accordingly, in this example, a first movement is defined (along a path similar to 415A) instructing the virtual agent 606 to travel from the initial position 610 to the first target 608A, a second movement is defined (along a path similar to 415B) instructing the virtual agent 606 to travel to the second target 608B, a third movement is defined (along a path similar to 415C) instructing the virtual agent 606 to travel to the third target 508C, and a fourth movement is defined (along a path similar to 415D) instructing the virtual agent 606 to travel to the fourth target 608D. Defining the first, second, third, and fourth movements of the plurality of movements may include defining a plurality of parameters characterizing the motion of the virtual agent 606 that can be used to represent first-order animations and/or goals.

As shown in FIG. 6A, at time t0, the virtual agent 606 may begin traveling from the initial position 610 toward the first target 608A in accordance with the first defined movement. In the snapshot of FIG. 6A, the virtual agent 606 is displayed along the first target-defined path 615A of the overall interpolated path. As shown for visualization purposes (e.g., and not as an element of the computer-generated environment), the virtual agent's position at the snapshot in time of FIG. 6A is represented by dot 621. Additionally, the position of the continuously moving goal along a first-order path in the snapshot is represented by circle 623, and the link between the virtual agent's current position at dot 621 and the goal at circle 623 is represented by line 622. As mentioned above, the goal and therefore the circle 623 may continuously move according to each of the defined plurality of first-order movements, such that the motion of the virtual agent 606 is goal-oriented, as opposed to directly target-oriented, as shown previously in FIG. 4. In some embodiments, the interpolation of first-order paths 415A-415B and/or the link represented by line 622 draws the virtual agent 606 toward the goal via a spring relationship. Thus, as shown in FIG. 6A, the virtual agent 606 may continuously travel toward the goal (e.g., represented by circle 623 in the snapshot of FIG. 6A), shown beginning the second go-to goal along a second first-order path (e.g., between Target 1 and Target 2) defined by the path 415B, such that the virtual agent is animated transitioning smoothly between the two go-to movements (e.g., before and after Target 1) along the interpolated path. Similar to the illustration and description with respect to FIGS. 5A-5C, virtual agent 606 may complete the first movement (i.e., reach the first target 608A) at time $t_1 + \Delta t_\alpha$, where $\Delta t_\alpha$ represents the additional travel time that may be introduced by the inertial delay (assuming a non-zero inertial delay), which may compensate for the pauses or breaks in motion that would otherwise occur using first-order animation techniques when there are pauses between movements as shown in the timeline of FIG. 3.

FIG. 6B-6C illustrate and continues the example of FIG. 6A, with the virtual agent 606 having traveled from the initial position 610 to the first target 608A, thus completing the first go-to movement, and having traveled from the first target 608A to the second target 608B (a moving/dynamic target), thus completing the second go-to movement, and beginning to travel to the third target in the snapshot of FIG. 6B. Additionally, the virtual agent 606 has traveled from the second target 608B to the third target 608C, thus completing the third go-to movement, and begins to move to the fourth target 608D in the snapshot of FIG. 6C. The interpolated path for animation of virtual agent 606 is represented by target defined paths 615A-615D.

Similar to the description with respect to FIGS. 5A-5C, the virtual agent 606 may travel sequentially to targets by moving toward a relative goal (e.g., along the plurality of first-order animations, according to relationship represented by link (e.g., represented by line 622)). As indicated in FIG. 6B, the second target 608B, like target 408B, is a dynamic target that may move within the computer-generated environment. In a similar manner as illustrated in FIG. 4, the movement of target 608B can cause the virtual agent 606 to have a nonlinear path of motion. However, in FIG. 6B, the interpolation of the first-order path to the second target generates a second-order animation path of movement that is smoother along target-defined path 615B compared with target-defined path 415B. In particular, the smoothing can manifest as smaller deviations from a linear path drawn between the first target and the second target. In particular, for the example of FIG. 6B, the link represented by line 622 and the inertial delay smooths out the curve because the virtual agent does not travel to the most distant points of the first-order path before the goal returns from these most distant points. Likewise, the interpolation of the first-order path to the third target generates a second-order animation path of movement that is smoother along target-defined path 615C compared with target-defined path 415C (e.g., with a smoother transition from the reaching the second target to traveling to the third target).

As shown in the snapshot of FIG. 6B, the virtual agent 606 may reach the second target 608B, thus completing the second go-to movement, at time $t_3+\Delta t_\beta$, where $\Delta t_\beta$ represents a second inertial delay (assuming a non-zero inertial delay) incurred by the interpolated motion of the virtual agent 606 as the virtual agent 606 transitions from completing the second movement to initiating the third movement, rather than arriving at $t_3$ as indicated by the period $T_2$ in the timeline 330 for FIG. 3. As shown in FIG. 6C, the virtual agent 606 may reach the third target 608C, thus completing the third go-to movement, at time $t_5+\Delta t_\lambda$, where $\Delta t_\lambda$ represents a third inertial delay (assuming a non-zero inertial delay) incurred by the interpolated motion of the virtual agent 606 as the virtual agent 606 transitions from completing the third go-to movement to initiating the fourth go-to movement, rather than arriving at $t_5$ as indicated by the period $T_3$ in the timeline 330 for FIG. 3.

The goal-oriented animation technique disclosed herein and illustrated and described with respect to FIGS. 6A-6C may improve upon the first-order animation of movement illustrated in FIG. 4. Referring to the interpolated animation path (illustrated by the second plurality of target-defined paths 615), it can be observed that between each transition (e.g., after reaching Target 1 and initiating travel to Target 2), the transition occurred smoothly (e.g., in a curved fashion that more gradually changes direction). Additionally, it can be observed that when traveling toward dynamic targets (e.g., Target 2), the resultant trajectory (e.g., 615B) was also smoother, thus appearing more realistic and natural during display of the animation of the movement along the animation path. In addition, interpolating the movements can result in a more fluid animation with shorter or no pauses between the different targets, as described with respect to FIGS. 5A-5C, and not repeated here for brevity.

Thus, as outlined above, advantages of the goal-based animation method disclosed herein include the generation of a more natural animation by smoothing the overall animation path using a second-order interpolation as compared with multiple first-order animation and reducing or eliminating pauses between multiple first-order animations. Additionally, the interpolation can improve the smoothness of the non-linear path toward dynamic targets. Additionally, the goal-based animation method disclosed herein allows for animating more natural and realistic smooth go-to animations to one or more stationary and/or dynamic targets in a simple manner using a plurality of first-order animation parameters, which considerably reduces the effort and time-consumption on the part of the user.

As described with reference to timeline 330, an animation of a virtual agent can be user-defined by a user using one or more go-to movements. The go-to movements can be represented in timeline 330 by graphical elements 331A-331D. In some embodiments, each of the go-to movements can be defined using movement parameters. FIGS. 7A-7B illustrate example representations of user interfaces for defining parameters of a movement of a virtual agent, and optionally a target, according to some embodiments of the disclosure. As described herein, a virtual agent and a plurality of stationary and/or dynamic targets within a computer-generated environment may be animated to produce a user-defined animation path of movement between the virtual agent and each of the plurality of stationary and/or dynamic targets, for example. The animation (e.g., movement) may be defined according to a plurality of user-selectable/definable parameters. In some embodiments, a plurality of parameters may be selectable/definable for the virtual agent(s). In some embodiments, a plurality of parameters may be selectable/definable for each of the plurality of targets. In some embodiments, some of the parameters shown in the representations of user interfaces 700 and 710 may be set to default settings (e.g., defined using default values) until updated by the user.

FIG. 7A illustrates an example representation of a user interface 700 for defining parameters of a movement of a virtual agent according to some embodiments of the disclosure. As shown in FIG. 7A, the user interface 700 may be displayed in a list format. In some embodiments, user interface 700 can include a plurality of parameters that are each selectable (e.g., by checking a checkbox, as shown) for defining a go-to movement of a virtual agent within a computer-generated environment. It should be understood that although the user interface 700 includes parameters for one go-to movement, that a similar user interface can be used to enable the user to individually animate each of a plurality of go-to movements for the virtual agent (or other virtual agents/objects in the computer-generated environment). Some or all of the parameters for each of the plurality of go-to movements may be similar, the same, or different.

As shown, the plurality of agent parameters may include an inertia parameter 701, a duration parameter 702 optionally including a start time 702A and/or an end time (not shown), an initial position parameter 703 (e.g., initial position 310, 410, 510, 610), target of the go-to movement parameter 704 and/or a movement function parameter 708 of the virtual agent. As an example, the target of go-to movement parameter 704 may allow the user to specify a destination toward which the virtual agent will travel and/or an object toward which the virtual agent will travel. For example, the target of the go-to movement parameter 704 may include a position option 705, which, if selected and when defined with a position parameter, defines the target of movement as a particular location (e.g., x, y coordinates, 0.2, 0.4) within the computer-generated environment. Additionally or alternatively, the target of the go-to movement parameter 704 may include an object option 706, which, if selected, defines the target of movement as an object within the computer-generated environment. In some embodiments, the objects in the computer-generated environment can be included in a drop-down menu represented in FIG. 7A as Objects 1-Object N. As an example, for defining the first go-to movement to a first target 308A, 408A, 508A, 608A, the target of the go-to movement parameter 704 may be selected to be Object 1, as indicated by highlighting 707, defining the target of movement to be the Object 1.

In some embodiments, the movement function parameter 708 may allow the user to specify the type of motion (i.e., the interpolation) the virtual agent follows when performing the go-to movement (e.g., as a first-order animation). In some embodiments, a plurality of movement function options can be included in a drop-down menu in user interface 700. The options for the movement function parameter 708 may include a plurality of movement types, such as, for example, linear interpolation, quadratic interpolation, cubic interpolation, etc. As an example, for defining the movement function of the go-to movement to the first target, the movement function parameter 708 may be selected to be a linear interpolation, as indicated by highlighting 709, defining the interpolation to be linear (as can be visualized via motion indicator 322A of graphical element 331A in FIG. 3), for example.

As shown in FIG. 7A, the inertia parameter 701 allows the user to define the amount of interpolation (for the second-order, goal-based animation) applied to the go-to motion. In some embodiments, inertia parameter 701 defines the springiness for a physics model of a spring connecting the virtual agent to the goal. As mentioned herein, the inertia value set for the inertia parameter 701 affects (via a direct relationship) the inertial delay that is incurred as the virtual agent travels along a particular path. As an example, an inertia parameter value of zero introduces no interpolation and/or no inertial delay; in other words, the virtual agent will move similarly to the trajectories shown in FIGS. 3 and 4, for example, using first-order animation paths and without interpolating the plurality of first-order animation paths. On the other hand, a non-zero inertia parameter will introduce second-order interpolation and/or an inertial delay that causes interpolation of the one or more first-order animation paths and causes the virtual agent to move similarly to the trajectories shown in FIGS. 5A-5C and 6A-6C, for example. In some embodiments, the inertia parameter is selectable from a range between zero and one, with zero representing no interpolation (e.g., no second-order animation effect), one representing the maximum interpolation, and a value between zero and one representing an intermediate amount of interpolation (with a higher value representing more interpolation). As mentioned above, the above-described agent parameters may be selected/defined for each go-to movement the user wishes to define within the computer-generated environment. Accordingly, for example, for a first go-to movement the user may define a first inertia parameter and for a second movement the user may define a second inertia parameter, different than the first inertia parameter, such that the interpolation of the first movement is based on the first inertia parameter and the second movement is based on the second inertia parameter.

In some embodiments, the target of a go-to movement can also have user-definable parameters. FIG. 7B illustrates an example representation of a user interface 710 for defining parameters of a movement of a target, according to some embodiments of the disclosure. As shown in FIG. 7B, the user interface 710 may display, optionally in a list format, a plurality of target parameters that are each selectable (e.g., by checking a checkbox, as shown) for defining a movement of a dynamic target or lack thereof of a stationary target. Accordingly, it should be understood that the user interface 710 may enable the user to individually control whether each of a plurality of targets is dynamic or stationary.

As shown, the user interface 710 may include an option for the target to be static or dynamic by selecting a static parameter 711 or a dynamic parameter 713. The static parameter 711 may include a position parameter 712 for defining the position (e.g., x, y coordinates, 0.2, 0.4) at which the stationary target will be displayed within the computer-generated environment. The dynamic parameter 713 may allow the user to define movement of the target, such that the target behaves dynamically and performs a user-defined movement. For example, for a dynamic target, the user may select an initial position option 714, and enter an initial position that defines the starting position (e.g., x, y coordinates) at which the target will be initially animated within the computer-generated environment. Additionally, the dynamic parameter 713 may include an action duration parameter 715 defining an amount of time the target is to perform the movement (and optionally a start or end time if the movement is not continuous). Finally, the dynamic parameter 713 may include a motion characteristics parameter 716, which allows the user to define the movement of the target. For example, as shown in FIG. 7B in a drop-down menu format, the motion characteristics parameter 716 may include a plurality of individual characteristics, such as Characteristic 1, shown at 717, Characteristic 2, etc. As an example, to define the movement of the target, individual characteristics of motion may be defined to animate the desired motion (e.g., by traveling in a circular motion as described with reference to FIGS. 4 and 6A-6C). The above-described target parameters may be selectively defined for each target the user wishes to display within the computer-generated environment.

It should be understood that the pluralities of parameters shown in 700 and 710 of FIGS. 7A-7B, respectively, are exemplary and that fewer or greater numbers of parameters, or different parameters, may be provided. For example, if the target is another virtual agent (e.g., a second virtual agent), the user interface 710 may include some or all of the parameters shown in the user interface 700 for defining a movement of the other virtual agent, as needed. It should be noted that although the pluralities of parameters may be entered/defined within the user interfaces 700 and 710, at least one of the pluralities of parameters may be defined within the computer-generated environment itself. For example, in some embodiments, the pluralities of targets (e.g., 308-608) shown in FIGS. 3-6C may be moved (e.g., selected and dragged) in the computer-generated environment to change a position/initial position of a respective target. Additionally, for example, moving the position/initial position of the respective target can change a position/initial position for a respective go-to movement parameter associated with the respective target. Likewise, for example, changes in one or more of the pluralities of parameters in user interfaces 700 or 710 can cause changes in the location/appearance of the targets, virtual agents, go-to movements, etc. in the computer-generated environment.

Figure 8A:
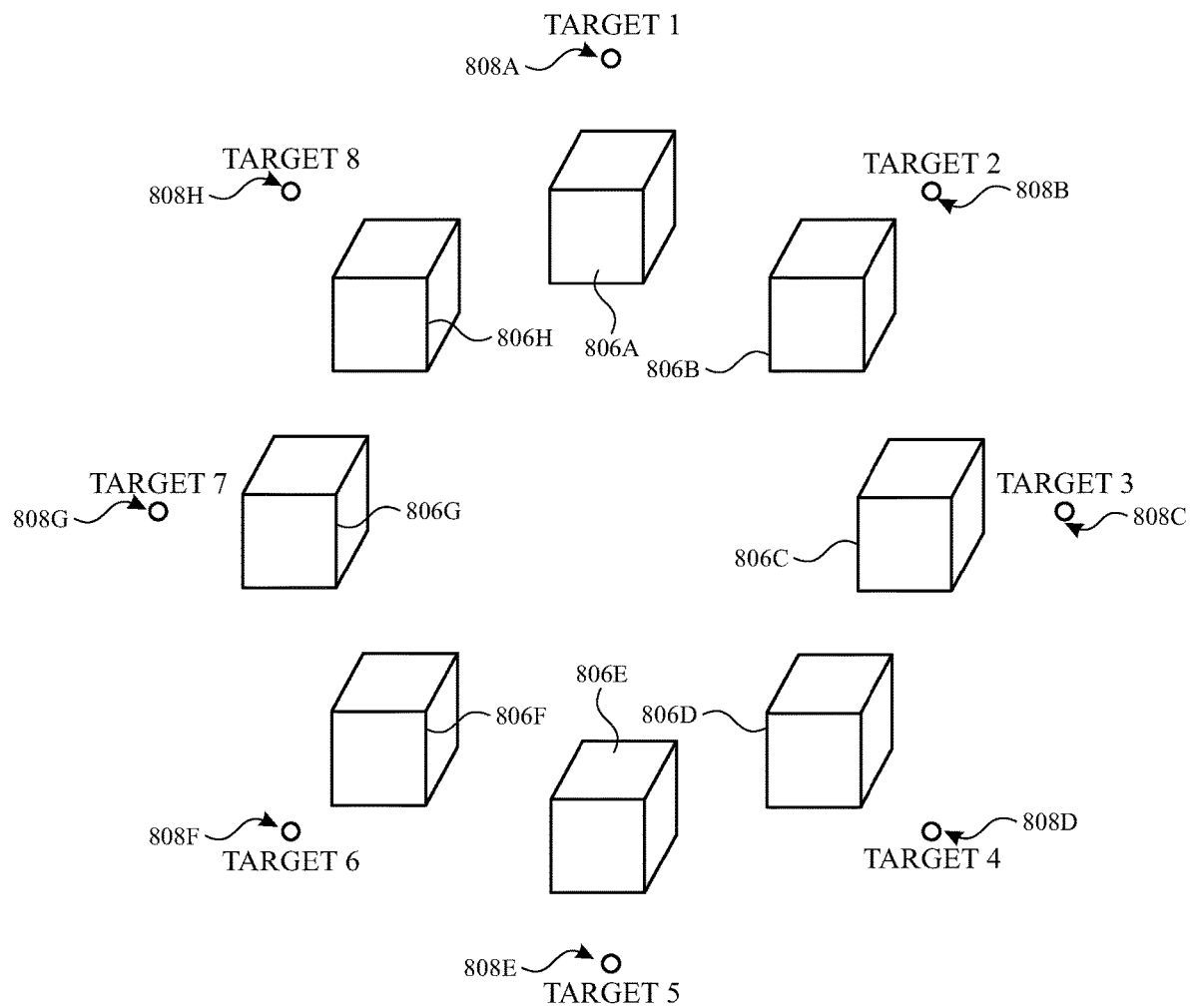
FIGS. 8A-8B illustrate examples of a plurality of virtual objects traveling to a plurality of targets as defined by a goal-based, second-order animation technique according to some embodiments of the disclosure.
Figure 8B:
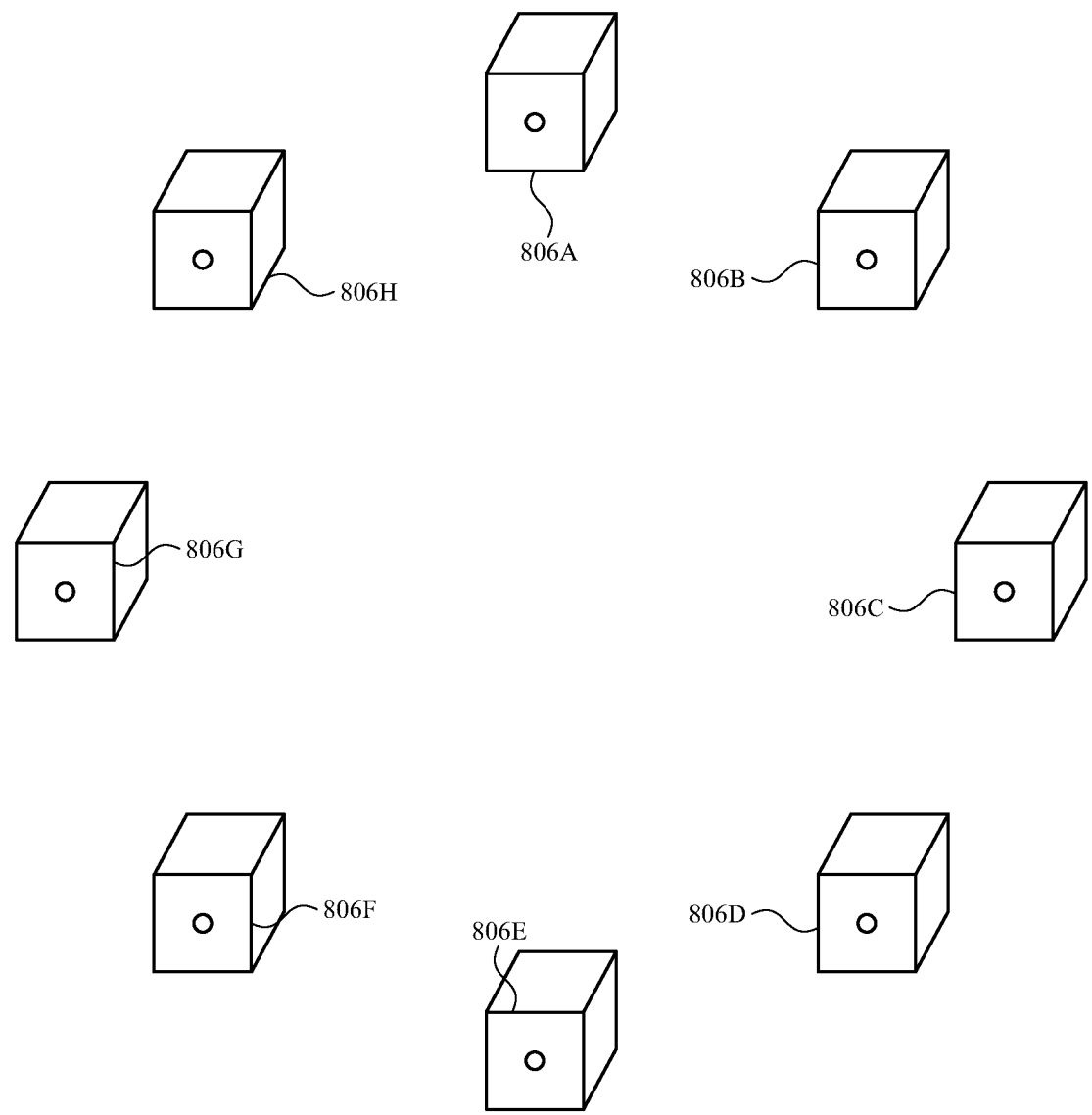

FIGS. 8A-8B illustrate examples of a plurality of virtual objects traveling to a plurality of targets as defined by a goal-based, second-order animation technique according to some embodiments of the disclosure. FIGS. 8A-8B illustrate a computer-generated environment including the plurality of objects 806A-806H and movement of the plurality of objects 806 to the plurality of targets 808-808H. The objects 806A-806H are represented as cubes in FIGS. 8A-8B, but can refer generally to any object or virtual agent displayed in the computer-generated environment.

In the embodiment illustrated in FIG. 8A, the plurality of objects 806A-806H are disposed in a circular arrangement (i.e., circular array), and equally spaced along the circle having an initial radius. As a result, each object can be located at respective location within the computer-generated environment with a distance of the original radius from an origin of the plurality of objects. As discussed with respect to FIGS. 7A-7B, a displayed user interface 700 may allow a user to define a movement of objects (e.g., a virtual agent or other object) to a particular destination using selectable parameters. In some embodiments, for a circular arrangement of objects, the plurality of parameters on the displayed user interface 700 can include a radius parameter that allows a user to redefine (i.e., increase or decrease) the radius of the circular arrangement of the plurality of objects 806A-806H. Thus, a go-to movement for the plurality of objects can be performed by adjusting one parameter and can cause an animation of the plurality of objects to assume a new position along a circle defined by the new radius parameter. It should be understood that, in some embodiments, the movement of each object to a corresponding target can be independent of the other objects (e.g., using a unique parameter set).

As shown in FIG. 8A, each target 808A-808H of the plurality of targets 808 may be a defined position/location (e.g., x, y, z coordinates) within the computer-generated environment on an updated radius for the circular arrangement. Additionally, in some embodiments, each of the plurality of objects 806A-806H may perform additional motions while moving to the new target or when in place. For example, the plurality of objects 806A-806H may be spinning/rotating in place and/or while moving from positions defined by the original radius to target positions defined by the new radius. Accordingly, in this embodiment, the first object 806A is animated to travel to the first target 808A (Target 1), the second object 806B is animated to travel to the second target (Target 2) 808B, and so on for each object and corresponding target, such that, finally, the eighth object 806H is animated to travel to the eighth target (Target 8) 808H. The movement of each object may be implemented using goal-based animation so that a second-order animation is implemented for the animation of each movement, and each object appears to travel to its respective target gradually and synchronously (e.g., each object reaches its respective target at the same moment in time).

FIG. 8B illustrates and continues the example of FIG. 8A, in which the plurality of objects 806A-806H have each traveled from the initial position to the corresponding target of the plurality of targets 808A-808H along the updated radius as defined by the goal-based animation technique disclosed herein. As shown in FIG. 8B, each object 806A-806H is now disposed within the computer-generated environment at a position/location associated with each corresponding target 808A-808H shown previously in FIG. 8A. Accordingly, as shown, for example, an updated radius associated with the circular array of the plurality of objects 806A-806H shown in FIG. 8B is larger than the initial radius associated with the circular array shown in FIG. 8A. In some embodiments, in the second configuration shown in FIG. 8B, the plurality of objects 806A-806H each optionally continue to spin/rotate in place.

In some embodiments, changing the radius parameter can result in instantaneous movement of objects 806A-806H to a new target. In some embodiments, changing the radius parameter can result in movement of the objects 806A-806H with each of the objects following a first-order animation between the initial position and the updated position at targets 808A-808H (e.g., similar to the movement described with respect to FIGS. 3-4). As discussed herein (e.g., with reference to FIGS. 5A-5C and FIGS. 6A-6C), the motion of the objects can be interpolated to allow for smoother transitions and thus a more continuous trajectory of motion.

As mentioned above, the goal-based animation method disclosed herein gives rise to a second-order animation. For example, rather than using first-order paths defining movement of the objects to the plurality of targets 808A-808H determined based on a change in the radius of the circular array, an interpolation can be applied to each of these movements. Thus, the change in the radius (from smaller to larger, as shown in FIG. 8B, for example) occurs gradually and synchronously, such that the path of movement for each object 806A-806H is smoother and possibly somewhat time delayed during display of an animation of the change in radius, for example. Thus, as outlined above, the disclosed goal-based animation method may produce a secondary animation that allows the displaying of a trajectory of motion when changing the radius of the circular array of the plurality of objects 806. Thus, an advantage of the disclosed goal-based animation method is that, when defining a change in an arrangement of a plurality of objects, a natural motion of the objects during a change in the arrangement may be generated without much user input.

It should be understood that, while the circular array of the plurality of objects is displayed in a vertical plane of the drawing sheet, the circular array of the plurality of objects can be displayed in other planes as well (e.g., horizontal plane, etc.). It should also be understood that the plurality of objects may be arranged in other arrangements different than a circle, as desired, such as, for example, rectangular arrangements, triangular arrangements, octagonal arrangements, etc. It should also be understood that, as similarly described when referring to FIGS. 5A-5C and 6A-6C, the plurality of targets may alternatively be objects, which may be stationary or dynamic, for example. In such a case, for example, a motion of a virtual agent traveling toward a dynamic can be interpolated, as described hereinabove, such that to produce a smooth path of motion, as an example.

In some embodiments, as mentioned previously in the disclosure, an animation can be defined between two virtual agents. Accordingly, as an example, a first virtual agent and a second virtual agent can be generated within a computer-generated environment, where the second virtual agent, with respect to the first virtual agent, functions as a dynamic target. In this embodiment, the second virtual agent may be provided with a second set of user-defined go-to parameters (i.e., set of agent parameters, as shown in FIG. 7A), different from a first set of user-defined go-to parameters associated with the first virtual agent. The first set of user-defined go-to parameters may define a first movement of the first virtual agent to the second virtual agent. The second set of user-defined go-to parameters may define a second movement of the second virtual agent, wherein the second movement causes the second virtual agent to travel to some area within the computer-generated environment (e.g., a location, an object, etc.). Then, in accordance with the disclosed goal-based animation technique, the first movement (and the second movement, if applicable) may be interpolated, such that an interpolated animation path is generated from the first virtual agent to the second virtual agent. Thus, during display of the animation of the first and the second movements, the first virtual agent may appear to smoothly follow (i.e., chase) the second virtual agent as the second virtual agent moves within the computer-generated environment according to the second movement.

FIG. 9 illustrates an example process 900 for animating a virtual agent in a computer-generated environment in accordance with some embodiments of the disclosure. Process 900 is optionally performed at an electronic device such as device 100, device 200 or device 250. Some operations in process 900 are optionally combined and/or optionally omitted. The order of some operations in process 900 is optionally changed, in some embodiments.

In some embodiments, operations of process 900 are performed at an electronic device in communication with a display and one or more input devices. A computer-generated environment is optionally displayed/presented via the display (e.g., using display 214). The computer-generated environment includes, in some embodiments, a first virtual agent and a plurality of targets including a first target and a second target, as shown at 902. While presenting the computer-generated environment, a plurality of movements of the first virtual agent is defined, including a first movement of the first virtual agent to the first target and a second movement of the first virtual agent to the second target (e.g., generating go-to movements as represented by graphical elements 331A and 331B, optionally using user interface 700 to generate each movement). Then, at 904, the first movement and the second movement are interpolated to generate an interpolated animation path of movement of the first virtual agent to the first target and to the second target, wherein the interpolated animation path is different from a first animation path for animating the first movement and a second animation path for animating the second movement (e.g., interpolated animation path of paths 515A-515D is different than animation of plurality of paths 315A-315D). At 906, the electronic device causes, in some embodiments, the displayed first virtual agent to move along the interpolated animation path to the first target and to the second target, such that the animation of the movement is displayed. In some embodiments, displaying the animation of the movement can include tracing the interpolated animation path during movement of the first virtual agent.

Additionally or alternatively to one or more of the embodiments disclosed above, in some embodiments, the first target and the second target are stationary targets, the first animation path and the second animation path are each linear, and the interpolated animation path includes a smoothed transition between movement to the first target and movement to the second target relative to transition of the first animation path to the second animation path.

Additionally or alternatively to one or more of the embodiments disclosed above, in some embodiments, the first target is a moving (e.g., a dynamic) target, the first animation path is non-linear, and the interpolated animation path includes a smoother path for movement of the first virtual agent to the first target relative to the first animation path.

Additionally or alternatively to one or more of the embodiments disclosed above, in some embodiments, as shown at 908, the defining the plurality of movements of the first virtual agent includes a pause between the first movement and the second movement, and the interpolated animation path reduces or eliminates a pause between an end of the first movement and a start of the second movement.

Additionally or alternatively to one or more of the embodiments disclosed above, in some embodiments, as shown at 910, the interpolation of the first movement and the second movement comprises generating the first animation path and the second animation path, and generating the interpolated animation path as an animation of the first virtual agent moving with an inertial delay to follow a position along the first animation path and the second animation path.

Additionally or alternatively to one or more of the embodiments disclosed above, in some embodiments, as shown at 912, the inertial delay defines a spring relationship between the first virtual agent and the position along the first animation path and the second animation path.

Additionally or alternatively to one or more of the embodiments disclosed above, in some embodiments, the defining one movement of the plurality of movements of the first virtual agent includes defining a start time, a duration (e.g., action duration), a target of movement (e.g., a location or an object), a movement function (e.g., linear interpolation) and/or an inertia parameter of the first virtual agent.

Additionally or alternatively to one or more of the embodiments disclosed above, in some embodiments, as shown at 914, the defining the plurality of movements comprises defining a first inertia parameter for the first movement and a second inertia parameter, different than the first inertia parameter, for the second movement, wherein the interpolation of the first movement and the second movement is based on the first inertia parameter and the second inertia parameter.

Additionally or alternatively to one or more of the embodiments disclosed above, in some embodiments, one of the plurality of targets is a second virtual agent.

Although example process 900 describes animating a virtual agent in the context of a plurality of targets, it is understood that process 900 is not so limited. For example, the techniques described herein can be applied for a single target as well. In some embodiments, the computer-generated environment includes a first virtual agent and a first target that is configured to move within the computer-generated environment. While presenting the computer-generated environment, a movement of the first virtual agent to the first target is defined. Then, the movement is interpolated to generate a second-order animation path of movement of the first virtual agent to the first target, wherein the second-order animation path is different from a first-order animation path animating the movement. The electronic device causes, in some embodiments, the displayed first virtual agent to move along the second-order animation path to the first target, such that the animation of the movement is displayed. In some embodiments, displaying the animation of the movement can include tracing the interpolated animation path during movement of the first virtual agent.

Additionally or alternatively to one or more of the embodiments disclosed above, in some embodiments, the second-order animation path is non-linear, and the second-order animation path includes a smoother path for movement of the first virtual agent to the first target relative to the first-order animation path.

Additionally or alternatively to one or more of the embodiments disclosed above, in some embodiments the interpolation of the movement comprises generating the first-order animation path, and generating the second-order animation path as an animation of the first virtual agent moving with an inertial delay to follow a position along the first-order animation path.

Additionally or alternatively to one or more of the embodiments disclosed above, in some embodiments, the inertial delay defines a spring relationship between the first virtual agent and the position along the first-order animation path. Additionally or alternatively to one or more of the embodiments disclosed above, in some embodiments, defining the movement of the first virtual agent includes defining a start time, a duration, a target of movement, a movement function and/or an inertia parameter of the first virtual agent.

Additionally or alternatively to one or more of the embodiments disclosed above, in some embodiments, defining the movement comprises defining an inertia parameter for the movement, and the interpolation of the movement is based on the inertia parameter.

Additionally or alternatively to one or more of the embodiments disclosed above, in some embodiments, the first target is a second virtual agent.

It should be understood that the particular order of the description of the operations in FIG. 9 is merely exemplary and is not intended to indicate that the described order is the only order in which the operations could be performed. One of ordinary skill in the art would recognize various ways to reorder the operations described herein.

The operations of processes described herein are optionally implemented using a non-transitory computer readable storage medium storing instructions, which when executed by one or more processors, cause the one or more processors to perform any of the processes/methods described herein.

The operations of processes described herein are optionally implemented using an electronic device with a processor, memory and a program stored in the memory (or in an electronic device with multiple processors, memories and/or programs stored in the one or more memories). The one or more programs stored in the memory cause the processor(s) to perform any of the above operations when the one or more programs are executed. In some embodiments, the operations of process described herein are optionally implemented using one or more functional modules running in an information processing apparatus such as general-purpose processors (e.g., as described with respect to FIGS. 2A-2B) or in one or more application specific chips (e.g., ASIC(s)). In some embodiments, the operations described herein with reference to FIG. 8 are optionally implemented by components illustrated in FIGS. 2A-2B.

The terminology used herein is not intended to be limiting. As used herein, the singular forms "a," "an," and "the" are intended to include the plural forms, unless the context clearly indicates otherwise. As used herein, the term "and/or" refers to and encompasses any combinations of one or more of the associated listed items. As used herein, the terms "includes," "including," "comprises," and/or "comprising," specify the presence of stated features, integers, steps, operations, elements, and/or components, but do not preclude the presence or addition of one or more other features, integers, steps, operations, elements, components, and/or groups thereof. Additionally, it is understood that the terms "first," "second," etc. as used herein to describe various elements, are not intended to limit these elements, but instead are used to distinguish one element from another.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

The invention claimed is:

1. A method comprising:
at an electronic device in communication with a display and one or more input devices:
displaying, using the display, a computer-generated environment including a first virtual agent and a plurality of targets, the plurality of targets including a first target and a second target;
defining a plurality of movements of the first virtual agent including a first movement of the first virtual agent to the first target and a second movement of the first virtual agent to the second target;
interpolating the first movement and the second movement to generate an interpolated animation path of movement of the first virtual agent to the first target and to the second target, wherein the interpolated animation path is different from a first animation path for animating the first movement and a second animation path for animating the second movement and wherein interpolating the first movement and the second movement comprises:
generating the first animation path and the second animation path, and
generating the interpolated animation path as an animation of the first virtual agent moving with an inertial delay to follow a position along the first animation path and the second animation path; and
displaying the animation of the movement of the first virtual agent along the interpolated animation path to the first target and to the second target.

2. The method of claim 1, wherein the first target and the second target are stationary targets, the first animation path and the second animation path are each linear, and the interpolated animation path includes a smoothed transition between movement to the first target and movement to the second target relative to transition of the first animation path to the second animation path.

3. The method of claim 1, wherein the first target is a moving target, the first animation path is non-linear, and the interpolated animation path includes a smoother path for movement of the first virtual agent to the first target relative to the first animation path.

4. The method of claim 1, wherein the defining the plurality of movements of the first virtual agent includes a pause between the first movement and the second movement, and wherein the interpolated animation path reduces or eliminates a pause between an end of the first movement and a start of the second movement.

5. The method of claim 1, wherein the inertial delay defines a spring relationship between the first virtual agent and the position along the first animation path and the second animation path.

6. The method of claim 1, wherein defining one movement of the plurality of movements of the first virtual agent includes defining a start time, a duration, a target of movement, a movement function and an inertia parameter of the first virtual agent.

7. The method of claim 1, wherein defining the plurality of movements comprises defining a first inertia parameter for the first movement and a second inertia parameter, different than the first inertia parameter, for the second movement, wherein interpolating the first movement and the second movement is based on the first inertia parameter and the second inertia parameter.

8. The method of claim 1, wherein one of the plurality of targets is a second virtual agent.

9. A non-transitory computer readable storage medium storing instructions, which when executed by one or more processors, cause the one or more processors to:
at an electronic device in communication with a display and one or more input devices:
display, using the display, a computer-generated environment including a first virtual agent and a plurality of targets, the plurality of targets including a first target and a second target;
define a plurality of movements of the first virtual agent including a first movement of the first virtual agent to the first target and a second movement of the first virtual agent to the second target;
interpolate the first movement and the second movement to generate an interpolated animation path of movement of the first virtual agent to the first target and to the second target, wherein the interpolated animation path is different from a first animation path for animating the first movement and a second animation path for animating the second movement and wherein interpolating the first movement and the second movement comprises:
generating the first animation path and the second animation path, and generating the interpolated animation path as an animation of the first virtual agent moving with an inertial delay to follow a position along the first animation path and the second animation path; and display the animation of the movement of the first virtual agent along the interpolated animation path to the first target and to the second target.

10. The non-transitory computer readable storage medium of claim 9,
wherein the first target and the second target are stationary targets, the first animation path and the second animation path are each linear, and the interpolated animation path includes a smoothed transition between movement to the first target and movement to the second target relative to transition of the first animation path to the second animation path.

11. The non-transitory computer readable storage medium of claim 9,
wherein the first target is a moving target, the first animation path is non-linear, and the interpolated animation path includes a smoother path for movement of the first virtual agent to the first target relative to the first animation path.

12. The non-transitory computer readable storage medium of claim 9, wherein defining the plurality of movements of the first virtual agent includes a pause between the first movement and the second movement, and wherein the interpolated animation path reduces or eliminates a pause between an end of the first movement and a start of the second movement.

13. The non-transitory computer readable storage medium of claim 9, wherein the inertial delay defines a spring relationship between the first virtual agent and the position along the first animation path and the second animation path.

14. The non-transitory computer readable storage medium of claim 9, wherein defining one movement of the plurality of movements of the first virtual agent includes defining a start time, a duration, a target or movement, a movement function and an inertia parameter of the first virtual agent.

15. An electronic device comprising:
one or more processors;
memory; and
one or more programs, wherein the one or more programs are stored in the memory and configured to be executed by the one or more processors, the one or more programs including instructions for:
displaying, using a display in communication with the electronic device, a computer-generated environment including a first virtual agent and a first target that is configured to move within the computer-generated environment;
defining a movement of the first virtual agent to the first target;
interpolating the movement to generate a second-order animation path of movement of the first virtual agent to the first target, wherein the second-order animation path is different from a first-order animation path animating the movement, the second-order animation path is non-linear, and the second-order animation path includes a smoother path for movement of the first virtual agent to the first target relative to the first-order animation path; and
displaying the animation of the movement of the first virtual agent along the second-order animation path to the first target.

16. The electronic device of claim 15, wherein interpolating the movement comprises:
generating the first-order animation path; and
generating the second-order animation path as an animation of the first virtual agent moving with an inertial delay to follow a position along the first-order animation path.

17. The electronic device of claim 16, wherein the inertial delay defines a spring relationship between the first virtual agent and the position along the first-order animation path.

18. The electronic device of claim 15, wherein defining the movement of the first virtual agent includes defining a start time, a duration, a target of movement, a movement function and an inertia parameter of the first virtual agent.

19. The electronic device of claim 15, wherein defining the movement comprises defining an inertia parameter for the movement, wherein interpolating the movement is based on the inertia parameter.

20. The electronic device of claim 15, wherein the first target is a second virtual agent.

* * * * *